(12) United States Patent
Yu et al.

(10) Patent No.: US 12,549,372 B2
(45) Date of Patent: Feb. 10, 2026

(54) NETWORK ACCESS METHOD, USER EQUIPMENT, NETWORK ENTITY, AND STORAGE MEDIUM

(71) Applicant: Alibaba Group Holding Limited, George Town (KY)

(72) Inventors: Xiaobo Yu, Beijing (CN); Dapeng Liu, Beijing (CN); Jin Peng, Beijing (CN); Hongru Zhu, Beijing (CN)

(73) Assignee: Alibaba Group Holding Limited (KY)

( * ) Notice: Subject to any disclaimer, the term of this patent is extended or adjusted under 35 U.S.C. 154(b) by 921 days.

(21) Appl. No.: 17/314,943

(22) Filed: May 7, 2021

(65) Prior Publication Data

US 2021/0385088 A1    Dec. 9, 2021

(30) Foreign Application Priority Data

Jun. 3, 2020    (CN) .......................... 202010496979.1

(51) Int. Cl.
*H04L 9/32* (2006.01)
*H04L 9/40* (2022.01)
*H04W 12/06* (2021.01)

(52) U.S. Cl.
CPC ............ *H04L 9/3226* (2013.01); *H04L 63/08* (2013.01); *H04W 12/06* (2013.01)

(58) Field of Classification Search
CPC ...... H04W 12/06; H04W 12/10; H04L 9/3226
See application file for complete search history.

(56) References Cited

U.S. PATENT DOCUMENTS

| | | | |
|---|---|---|---|
| 8,296,825 B2 * | 10/2012 | Leone | ................... H04L 63/166 |
| | | | 713/153 |
| 9,185,556 B2 | 11/2015 | Hughes | |
| 9,426,653 B2 | 8/2016 | Becker | |

(Continued)

FOREIGN PATENT DOCUMENTS

WO    2017040046    3/2017

OTHER PUBLICATIONS

J. Li, D. D. Penda, H. Sahlin, P. Schliwa-Bertling, M. Folke and M. Stattin, "An Overview of 5G System Accessibility Differentiation and Control," in IEEE Communications Standards Magazine, vol. 5, No. 4, pp. 104-111, Dec. 2021. (Year: 2021).*

(Continued)

*Primary Examiner* — Kari L Schmidt
(74) *Attorney, Agent, or Firm* — Van Pelt, Yi & James LLP

(57) ABSTRACT

The present application discloses a method, device, and system for providing security credentials to access a non-public network. The method includes receiving, by a terminal, an identifier of a first network and corresponding encryption information. The first network includes a non-public network. The encryption information includes encrypted security credentials for the first network. The terminal receives the identifier of the first network and the corresponding encryption information from a second network that is different from the first network. The method further includes decrypting, by the terminal, the encryption information. The encryption information is decrypted based at least in part on default credentials corresponding to the identifier of the first network. The security credentials of the first network are obtained based at least in part on the decrypted encryption information.

19 Claims, 12 Drawing Sheets

(56) References Cited

U.S. PATENT DOCUMENTS

| | | | |
|---|---|---|---|
| 10,698,923 B2 | 6/2020 | Martin | |
| 10,789,380 B2 | 9/2020 | Osswald | |
| 11,234,132 B1* | 1/2022 | Sicard | H04W 12/72 |
| 12,335,845 B2* | 6/2025 | Yang | H04W 24/02 |
| 2002/0069240 A1* | 6/2002 | Berk | H04L 61/30 |
| | | | 707/999.107 |
| 2005/0102509 A1* | 5/2005 | Fascenda | G07F 7/1016 |
| | | | 713/165 |
| 2012/0028637 A1* | 2/2012 | Kashikar | H04W 76/20 |
| | | | 455/426.1 |
| 2013/0250783 A1* | 9/2013 | Ericson | H04W 60/005 |
| | | | 370/252 |
| 2015/0092701 A1* | 4/2015 | Horn | H04W 4/50 |
| | | | 370/329 |
| 2015/0172997 A1* | 6/2015 | Griot | H04W 48/08 |
| | | | 455/411 |
| 2017/0251357 A1* | 8/2017 | Iwai | H04W 92/14 |
| 2017/0339059 A1 | 11/2017 | Averi | |
| 2018/0234386 A1* | 8/2018 | Row, II | H04L 63/0884 |
| 2018/0262978 A1* | 9/2018 | Kahn | H04W 48/10 |
| 2019/0268757 A1* | 8/2019 | Yi | H04W 60/00 |
| 2019/0274047 A1 | 9/2019 | Singh | |
| 2019/0289462 A1* | 9/2019 | Kim | H04W 8/20 |
| 2019/0335330 A1* | 10/2019 | Salkintzis | H04W 12/08 |
| 2020/0275279 A1* | 8/2020 | Tangudu | H04W 12/068 |
| 2021/0058784 A1* | 2/2021 | Kedalagudde | H04W 48/18 |
| 2021/0218744 A1* | 7/2021 | Gandhi | H04L 63/062 |
| 2021/0258857 A1* | 8/2021 | Won | H04W 48/18 |
| 2021/0281445 A1* | 9/2021 | Trim | H04L 41/5041 |
| 2021/0329716 A1* | 10/2021 | Wong | H04L 65/1016 |
| 2021/0345226 A1* | 11/2021 | Liao | H04W 48/18 |
| 2022/0038898 A1* | 2/2022 | Stojanovski | H04W 12/06 |
| 2022/0225093 A1* | 7/2022 | Sasi | H04W 12/06 |
| 2022/0361068 A1* | 11/2022 | Liu | H04W 36/0058 |
| 2022/0417834 A1* | 12/2022 | Liu | H04W 36/0011 |
| 2023/0039877 A1* | 2/2023 | Suh | H04W 76/18 |

OTHER PUBLICATIONS

I. Ahmad, S. Shahabuddin, T. Kumar, J. Okwuibe, A. Gurtov and M. Ylianttila, "Security for 5G and Beyond," in IEEE Communications Surveys & Tutorials, vol. 21, No. 4, pp. 3682-3722, Fourthquarter 2019. (Year: 2019).*

* cited by examiner

200

375

NETWORK ACCESS METHOD, USER EQUIPMENT, NETWORK ENTITY, AND STORAGE MEDIUM

CROSS REFERENCE TO OTHER APPLICATIONS

This application claims priority to People's Republic of China Patent Application No. 202010496979.1 entitled NETWORK ACCESS METHOD, USER EQUIPMENT, NETWORK ENTITY, AND STORAGE MEDIUM filed Jun. 3, 2020 which is incorporated herein by reference for all purposes.

FIELD OF THE INVENTION

The present application relates to a field of communications technology. In particular, the present application relates to a network access method, user equipment, network entity, and storage medium.

BACKGROUND OF THE INVENTION

A non-public network (NPN), also called a local network or a private network, is a form of network deployment that is distinct from operator public networks, such as public land mobile networks (PLMN). Generally two types of non-public networks exist: isolated and independently set-up non-public networks (e.g., stand-alone NPN (SNPN)), and non-public networks integrated with public mobile networks (e.g., public network integrated NPN (PNI-NPN)). An SNPN does not rely on a PLMN and is independently operated by an SNPN operator. A PNI-NPN relies on a PLMN and is operated by a traditional operator. A need for mechanisms for terminals (e.g., UEs) to securely access NPNs exists.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation to the present application. Among the drawings.

DETAILED DESCRIPTION

Figure 1:
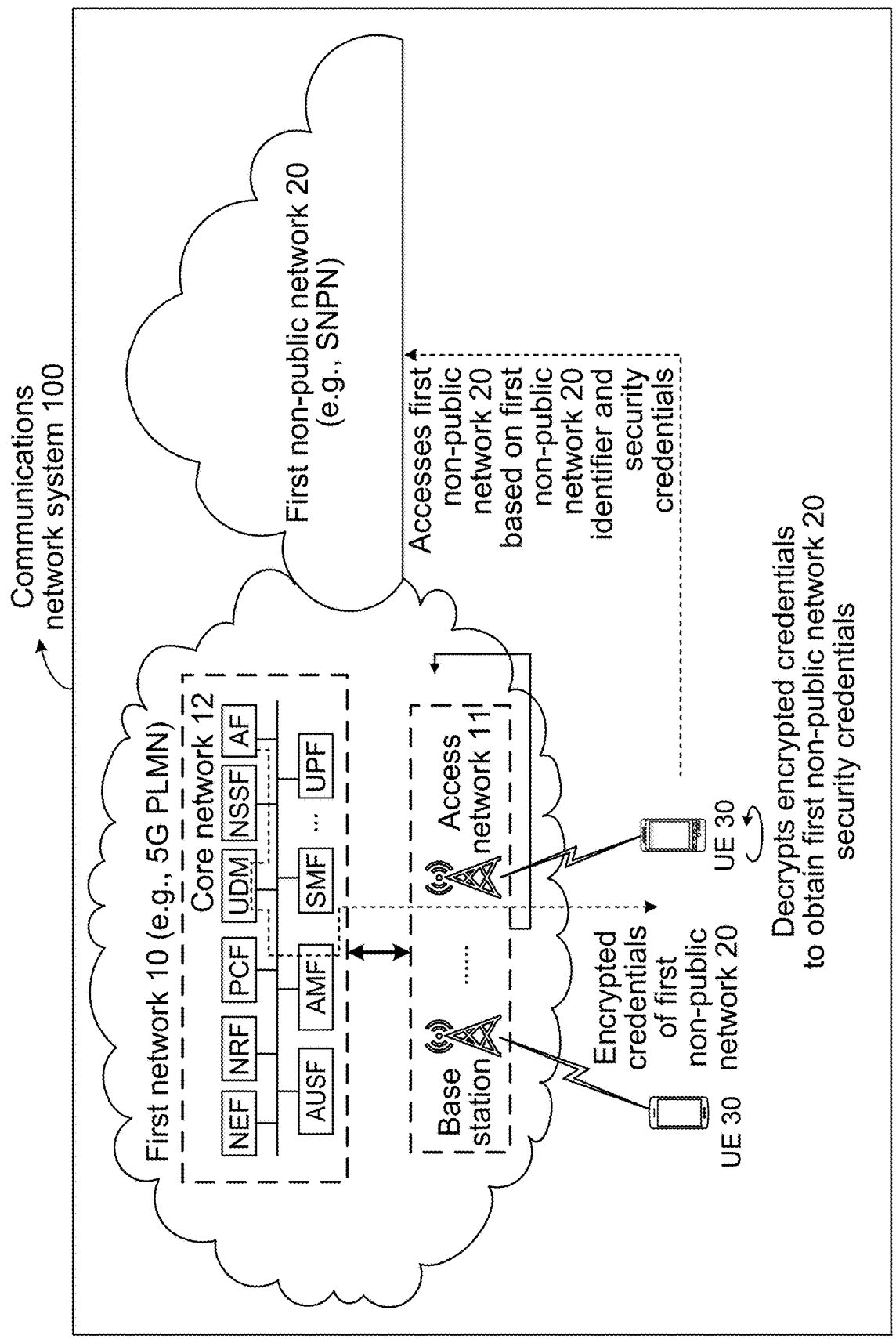
FIG. 1 is an architectural diagram of a mobile communications system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So as to further clarify the objectives, technical schemes, and advantages of the present application, technical schemes of the present application are described clearly and completely below in light of specific embodiments and corresponding drawings of the present application. Obviously, the described embodiments are merely some of the embodiments of the present application and not all the embodiments. So long as no additional creative effort is expended, all other embodiments that are obtained by persons with ordinary skill in the art on the basis of embodiments in the present application fall within the scope of protection of the present application.

As used herein, a "terminal" generally refers to a device comprising one or more processors. A terminal may also be referred to herein as a user equipment (UE). A terminal may be a device used (e.g., by a user) within, or connected to, a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), a mobile medical device, a camera, a wearable device (e.g., a Head-Mounted Device (HIVID), electronic clothes, electronic braces, an electronic necklace, an electronic accessory, an electronic tattoo, or a smart watch), a kiosk such as a vending machine, a smart home appliance, vehicle-mounted mobile stations, a door lock, a water meter, or an electricity meter, or the like. The terminal may be implemented as an Internet of Things (IoT) device. A terminal may run various operating systems.

FIG. 1 is an architectural diagram of a mobile communications system according to various embodiments of the present application.

Referring to FIG. 1, a network system such as mobile communications system 100 comprises: a first network 10 and a first non-public network 20. The first network 10 and the first non-public network 20 may be different forms of a network, but both first network 10 and the first non-public network 20 can provide services to a terminal such as UE 30. The first network 10 may be a 5G network, a public land mobile network (PLMN), etc. The first non-public network 20 may be a stand-alone non-public network (SNPN).

According to various embodiments, a non-public network (NPN) is configured for use by a private entity (e.g., an organization, enterprise, etc.). In some implementations, an NPN may be hosted by (or on) a PLMN. In some implementations, an NPN may be provided by (or used in connection with) a slice of PLMN. In some embodiments, an NPN is provided without being dependent on, or is operated independent from, a PLMN. An SNPN may be an NPN that does not rely on network functions provided by a PLMN.

A terminal (e.g., UE 30) may communicate with the first network 10 via an access network. In some embodiments, the access network includes one or more base stations. In some embodiments, the access network comprises one or more access points via which the terminal communicates with the first network 10.

A network may provide services to terminals connected to the network. For example, upon successfully accessing the first network 10, UE 30 may use the services provided by the first network 10. Similarly, upon successfully accessing the non-public network 20, UE 30 may use the services provided by the non-public network 20. In some embodiments, a terminal may be simultaneously connected to a plurality of networks. For example, depending on the communication capabilities of UE 30, UE 30 may simultaneously access the first network 10 and the first non-public network 20. In some embodiments, a terminal selectively accesses a network (e.g., in response to selection of a user, or in response to a determination that one or more criteria are satisfied). For example, UE30 may selectively access the first network 10 and a network in the first non-public network 20 at the same time.

In some embodiments, the first non-public network 20 is a network that provides specialized service to specific users (e.g., as distinguished from the concept of a mobile communications network deployed by an operator (also referred to as a "public network")). First non-public network 20 may also be referred to as a local network, which may be applied to the Industrial Internet of Things, regional emergency communications, or other such fields. For example, in the context of the Industrial Internet of Things, manufacturers in vertical industries may provide exclusive services to equipment in specified industries by building a non-public network such as first non-public network 20. For example, a factory may use a first non-public network 20 to serve automated equipment in the factory building. According to various embodiments, first non-public network 20 is an SNPN. Such a network does not rely on a PLMN and may be operated by an operator exclusively associated with the SNPN, obviating the need to switch to and from a PLMN. In some embodiments, first non-public network 20 is a PNI-NPN. A PNI-NPN is operated by a traditional operator (e.g., a telecommunications operator) and allows subscriptions to a PLMN. Switching between the PNI-NPN and the PLMN can be achieved by relying on (e.g., using) PLMN network functions.

Accordingly, in the context of the first non-public network 20 being an SNPN, the first network 10 may be a public network, such as a PLMN, deployed by a traditional operator. Alternatively, the first network 10 may be a second non-public network (e.g., a non-public network integrated with a public network such as a PNI-NPN). In the context of the first non-public network 20 being a PNI-NPN, the first network 10 may be a public network deployed by a traditional operator (e.g., a PLMN). First network 10 may be implemented as various other types of networks. For example, the first network 10 may be a network, other than a PLMN or a PNI-NPN, that is deployed by a traditional operator and differs from the first non-public network 20, but that permits access by a terminal (e.g., UE 30) and that can provide services to the terminal (e.g., UE 30). According to various embodiments, the public network can be implemented according to various network standards. For example, the public network may be a 4G or 5G network. Various other network standards may be implemented. FIG. 1 illustrates the example of a first network 10 that is a 5G public network (such as a PLMN) and a first non-public network 20 that is an SNPN.

As illustrated in FIG. 1, the first network 10 (e.g., a 5G public network) includes an access network 11 and a core network 12. Access network 11 may include one or more base stations, and the core network 12 may include, but is not limited to, the following network entities: an authentication server function (AUSF), a user plane function (UPF), an access and mobility management function (AMF), a unified data management (UDM), a network exposure function (NEF), a session management function (SMF), a network slice selection function (NSSF), a network repository function (NRF), a policy control function (PCF), and an application function (AF).

According to various embodiments, a terminal (e.g., UE 30) obtains services from the first network 10 and/or the non-public network 20. For example, the terminal may selectively communicate with either the first network 10 or the non-public network 20. The terminal may select to communicate with a particular network based at least in part on a user preference or user selection. In some embodiments, the terminal may select to communicate with a particular network based on a context of the terminal, an application running on the terminal, an application requesting a service, a particular service the terminal is requesting to obtain, etc. According to various embodiments, the terminal (e.g., UE 30) is a device that is subscribed to the first network 10 (e.g., registered with the first network 10), and also a device that obtains services (e.g., that requires services) provided by the non-public network 20. After successfully accessing the first network 10, the terminal (e.g., UE 30) may use services provided by the first network 10. For example, the terminal may use call services and data services provided by the first network 10. In some embodiments, before using the services provided by the first non-public network 20, the terminal (e.g., UE 30) needs to access the first non-public network 20. Regardless of whether it is an SNPN or a PNI-NPN, the first non-public network 20 provides services that satisfy high quality-of-service demands or requirements, while satisfying high security demands or requirements. Because the first non-public network 20 satisfies the high security demands or requirements, greater scrutiny is paid to the security associated with the access or connection of the terminal to the first non-public network 20. For example, an extent of security defined or required by first non-public network 20 may be correlated with an extent of security associated with the connection to, or access of, the first non-public network 20 by the terminal (e.g., UE 30). As another example, a relatively higher extent of security associated with the first non-public network may cause a relatively higher extent of security associated with the connection to, or access of, the first non-public network 20 by the terminal (e.g., UE 30). According to various embodiments, the first non-public network 20 authenticates a terminal (e.g., UE 30) based at least in part on independent security credentials. For example, first non-public network 20 uses the independent security credentials to authenticate UE 30 in connection with a request from UE 30 to access first non-public network 20 in order to meet the high security demands of the first non-public network 20. The UE 30 may initiate an access procedure for the first non-public network 20 based at least in part on independent security credentials of the first non-public network 20. Various embodiments solve the problem pertaining to the manner by which the terminal (e.g., the UE 30) securely obtains security credentials of the first non-public network 20 and/or the manner by which the terminal may access the first non-public network 20 based at least in part on security credentials.

According to various embodiments, the security credentials of the first non-public network 20 are encrypted and transmitted to the terminal (e.g., UE 30). The encryption of the security credentials before communication of such to the terminal ensures that the security credentials are secure. In addition, various embodiments use the first network 10, which the terminal (e.g., UE 30) has accessed, in connection with communication of the security credentials and/or authentication of the terminal for the first non-public network 20 (e.g., to allow for the terminal to access the first non-public network 20). The encrypted security credentials of the first non-public network 20 may communicate to the terminal based at least in part on using the first network 10 serving as a transmission channel for the encrypted security credentials of the first non-public network 20. In some embodiments, the communication procedure by which the terminal communicates over the first network 10 is modified in connection with communicating the encrypted security credentials of the first non-public network 20 to the terminal (e.g., UE 30). For example, the communication procedure by which the terminal communicates over the first network 10 may be modified based on using or modifying a network entity in the first network 10 in connection with enabling the terminal (e.g., UE 30) to decrypt the encrypted security credentials of first non-public network 20 from the encrypted security credentials. The terminal may securely access the first non-public network 20 based at least in part on using the decrypted first non-public network 20 (e.g., to authenticate the terminal with respect to the first non-public network 20). The problem of ensuring secure access of the terminal to the first non-public network 20 is thus solved.

Figure 2A:
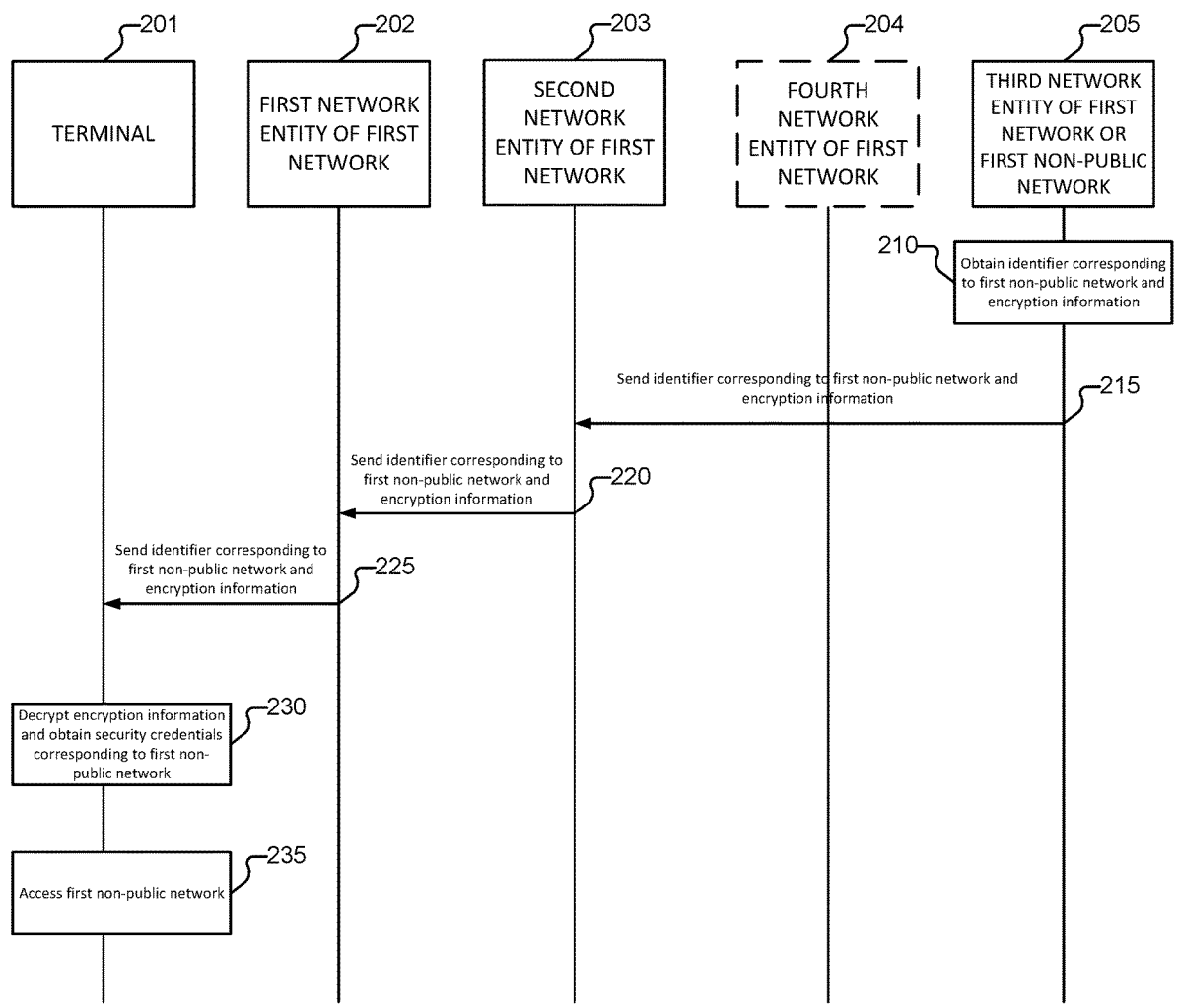
FIG. 2A is a flowchart of a method for a terminal accessing a first non-public network in connection with a first network according to various embodiments of the present application.

FIG. 2A is a flowchart of a method for a terminal accessing a first non-public network in connection with a first network according to various embodiments of the present application.

As illustrated in FIG. 2A, a system for implementing process 200 may include terminal 201, a first network entity 202 corresponding to a network entity of the first network, a second network entity 203 corresponding to a network entity of the first network, a fourth network entity 204 corresponding to a network entity of the first network, and a third network entity 205 corresponding to a network entity of the first network or first non-public network. According to various embodiments, the first network described in connection with process 200 may include first network 10 of system 100 of FIG. 1 (e.g., a 5G network, a PLMN, etc.), and the first non-public network described in connection with process 200 may include first non-public network 20 of system 100 of FIG. 1 (e.g., an NPN such as an SNPN). Process 200 may be implemented at least in part by system 100 of FIG. 1, and/or computer system 500 of FIG. 5.

At 210, an identifier corresponding to a first non-public network and encryption information are obtained. The encryption information may include encrypted security credentials for the first non-public network. In some embodiments, the third network entity 205 obtains the identifier corresponding to the first non-public network and the encryption information. The first network may determine that a credential corresponds to the terminal, and in response to such a determination, the first network may send the credentials (e.g., the encrypted credentials) to the terminal in an NAS message. In some embodiments, the identifier corresponding to a first non-public network and encryption information are obtained when the terminal wants to register with the first non-public network.

The security credentials for the first non-public network may be obtained based at least in part on a mapping of identifiers for non-public networks (or for networks generally) to security credentials. In some embodiments, the security credentials are encrypted at the first non-public network end (e.g., before the encryption information such as encrypted security credentials is provided to the first network).

At 215, the identifier corresponding to the first non-public network and the corresponding encryption information are communicated. In some embodiments, third network entity 205 communicates the identifier corresponding to the first non-public network and the corresponding encryption information to second network entity 203. The identifier corresponding to the first non-public network and the corresponding encryption information may be communicated to the second network entity 203 in a message (e.g., referred to herein as a second message).

At 220, the identifier corresponding to the first non-public network and the corresponding encryption information are communicated. In some embodiments, second network entity 203 communicates the identifier corresponding to the first non-public network and the corresponding encryption information to first network entity 202. The identifier corresponding to the first non-public network and the corresponding encryption information may be communicated to the first network entity 202 in a message (e.g., referred to herein as a fourth message).

At 225, the identifier corresponding to the first non-public network and the corresponding encryption information are communicated. In some embodiments, first network entity 202 communicates the identifier corresponding to the first non-public network and the corresponding encryption information to terminal 201. Terminal 201 may correspond to UE 30 of system 100 of FIG. 1. The identifier corresponding to the first non-public network and the corresponding encryption information may be communicated to the terminal 201 in a message (e.g., referred to herein as a sixth message).

In some embodiments, the AMF subscribes the onboarding information from the UDN, receives the Nudm_SDM_Notifiation from SDM with the encrypted credential and the UE ID, and in response to receiving the encrypted credential and the UE ID, sends the corresponding security credentials to the terminal 201 using a UE parameter update procedure.

At 230, the encryption information is decrypted. In some embodiments, the terminal 201 decrypts the encryption information such as in response to receiving the identifier corresponding to the first non-public network and the corresponding encryption information (e.g., in response to receiving the sixth message). The terminal 201 may obtain the security credentials for the first non-public network based at least in part on decrypting the encryption information.

In response to decrypting the encryption information, the terminal 201 may store the security credentials for the first non-public network in association with the identifier for the first non-public network. For example, the terminal 201 may store the security credentials for the first non-public network in a mapping of network identifiers to corresponding security credentials. In some embodiments, the terminal 201 updates or creates a network profile for the first non-public network. The network profile may be locally stored at the terminal 201 and/or may comprise settings and configurations of the first non-public network.

According to various embodiments, the terminal 201 decrypts the encryption information based at least in part on default credentials. Terminal 201 may store the default credentials in advance. The default credentials may be mapped to a particular network identifier (e.g., identifier of the first non-public network 20). As an example, the decryption of the encryption information may be based at least in part on public-key cryptography. The default credentials are associated with the identifier of the first non-public network. In some implementations, the encryption information is decrypted using a private key associated with terminal 201 (e.g., the first non-public network or the first network corresponding to the encrypted the encryption information is associated with a public key associated with terminal 201).

At 235, the first non-public network is accessed. In some embodiments, terminal 201 accesses the first non-public network after (e.g., in response to) the encryption information being decrypted. The terminal 201 may access the first non-public network based at least in part on the identifier corresponding to the first non-public network and the corresponding security credentials (e.g., the decrypted encryption information). For example, terminal 201 may use the identifier corresponding to the first non-public network and/or the corresponding security credentials in connection with an authentication of the terminal 201 with the first non-public network.

According to various embodiments, the third network entity 205 is a network entity that can simultaneously (or contemporaneously) interact with the first non-public network 20 and the first network 10 such as a core network of the first network 10. Third network entity 205 may provide some applications influencing routing, policy control, access to network exposure function (NEF), and other such functions, but is not limited to these. The third network entity 205 may be an application function (AF) that is internal to a network operator such as a traditional network operator. The network operator may be the operator (e.g., the organization) that manages/operates the first network 10. The third network entity 205 may be the AF of a third party (e.g., an SNPN operator or a cloud service provider). If the third network entity 205 is an AF internal to a traditional network operator, the third network entity 205 may be disposed within a trusted zone of the first network 10 (e.g., with other network entities of the first network 10). Additionally, or alternatively, if the third network entity 205 is an AF internal to a traditional network operator, the third network entity 205 may directly and interactively access the other network entities, such as the second network entity 203, in the first network 10.

Figure 2B:
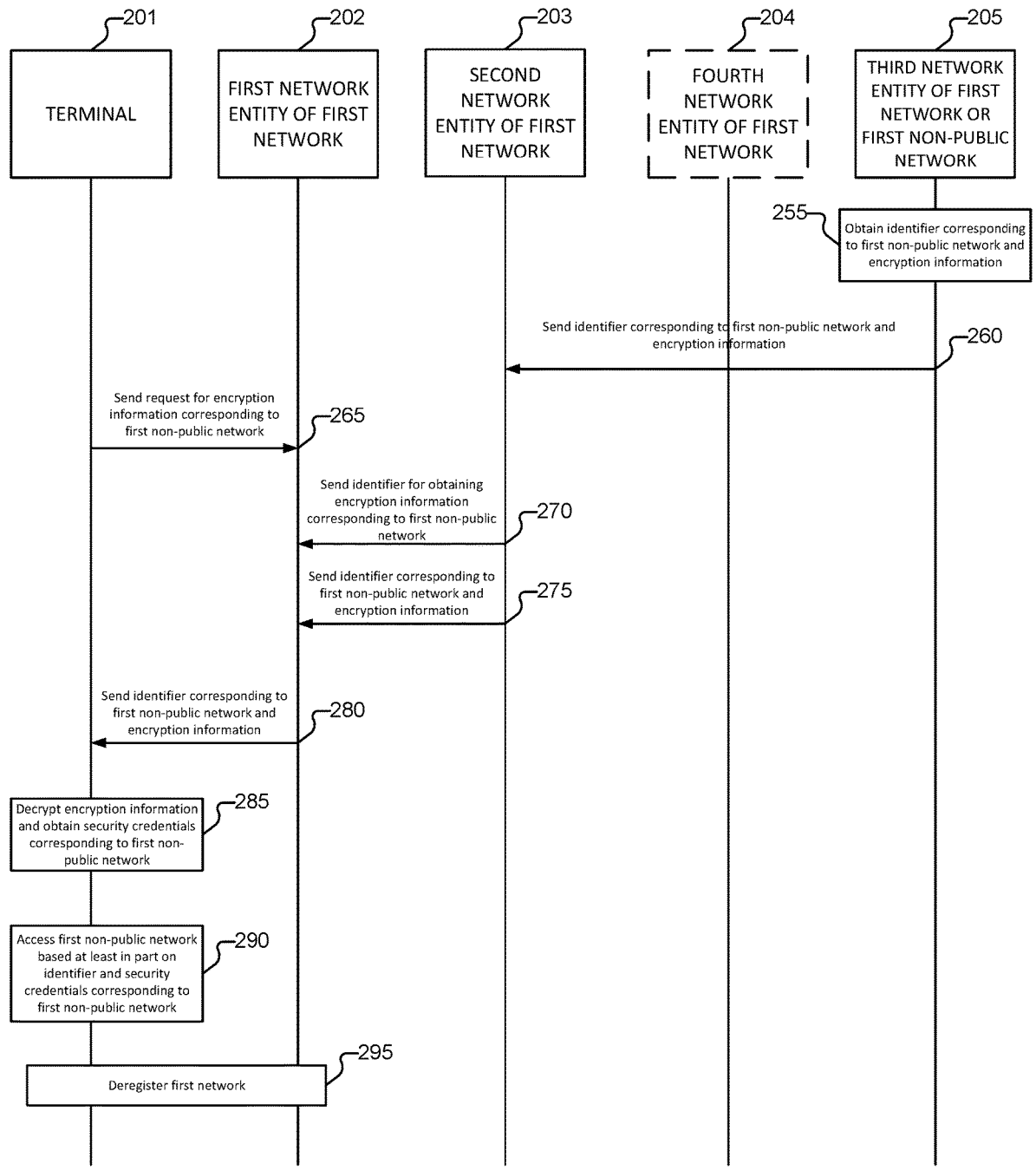
FIG. 2B is a flowchart of a method for a terminal accessing a first non-public network in connection with a first network according to various embodiments.

If the third network entity 205 is a third party AF (e.g., an entity of a network for an SNPN operator, etc.), the third network entity 205 may not be located within a trusted zone of the first network 10 with other network entities. In some embodiments, if the third network entity 205 is a third party AF, although the third network entity 205 may not be within a trusted zone, the third network entity 205 may access other network entities (e.g., may have permission to access such network entities), such as the second network entity 203 in the first network 10. The third network entity 205 may access other network entities through a fourth network entity 204 (e.g., an NEF) of the first network 10. The use of the fourth network entity 204 in connection with the third network entity 205 accessing other entities of the first network 10 may ensure the security of the first network 10. In FIGS. 2A and 2B, the dashed-line box of fourth network entity 204 (e.g., an NEF) is used to indicate that the fourth network entity 204 is an optional network entity. For example, various embodiments may not include fourth network entity 204 or may otherwise not use fourth network entity 204 in connection with the communication of the identifier of the first non-public network and/or corresponding encryption information. As another example, various embodiments may not use fourth network entity 204 in connection with terminal 201 accessing the first non-public network.

Accessing the second network entity 203 through the fourth network entity 204 may be performed based at least in part on use of an NEF parameter provision update message (e.g., Nnef_ParameterProvision_Update) and/or an NEF traffic influence update message (e.g., Nnef_TrafficInfluence_Update). The AF may send an NEF parameter provision update message or an NEF traffic influence update message to the NEF. The NEF parameter provision update message or the NEF traffic influence update message may include the identifier of the first non-public network 20 and/or the corresponding encryption information (e.g., encrypted security credentials). After receiving (e.g., in response to receiving) the NEF parameter provision update message or the NEF traffic influence update message, the NEF (e.g., the fourth network entity 204) sends a UDM parameter provision update message (e.g., Nudm_ParameterProvision_Update) to the unified data management (UDM). The UDM parameter provision update message includes the identifier of the first non-public network 20 and the corresponding encryption information (e.g., the encrypted security credentials for first non-public network 20). Optionally, various other NEF-related messages may also be used as AF-to-NEF interface messages. The function relating to the AF-to-NEF interface messages includes communication of the identifier of the first non-public network 20 and the corresponding encryption information (e.g., the encrypted security credentials for first non-public network 20) to the NEF. Various other UDM-related messages may also be used as NEF-to-UDM interface messages. The function relating to the NEF-to-UDM interface messages includes communication of the identifier of the first non-public network 20 and the corresponding encryption information (e.g., the encrypted security credentials for first non-public network 20) to the UDM. The communication of the identifier of the first non-public network 20 and the corresponding encryption information to the UDM may cause the UDM to store the identifier of the first non-public network and the corresponding encryption information.

According to various embodiments, the third network entity 205 obtains the identifier of the first non-public network 20 and the corresponding encryption information (e.g., the encrypted security credentials for first non-public network 20). There is no restriction on the manner in which the third network entity 205 obtains the identifier of the first non-public network 20 and the corresponding encryption information. In some embodiments, the identifier of the first non-public network 20 and the corresponding encryption information is set or defined in advance. As an example, the identifier and corresponding encryption information may be stored locally based on the setting or definition of such, and the obtaining the identifier and corresponding encryption information may include obtaining such from storage. In some embodiments, the third network entity 205 receives the identifier of the first non-public network 20 and the corresponding encryption information from a network entity in the first non-public network 20.

According to various embodiments, the third network entity 205 obtains the identifier corresponding to the first non-public network and/or corresponding encryption information based at least in part on receiving a message (e.g., a first message). For example, before communicating the identifier of the first non-public network 20 and the corresponding encryption information (e.g., the encrypted security credentials for first non-public network 20) via the first network 10, the third network entity 205 receives a first message. Reception of the first message may trigger the third network entity 205 to issue (e.g., obtain and/or communicate) the identifier of the first non-public network 20 and the corresponding encryption via the first network 10. There is no restriction on the manner in which the third network entity 205 receives the first message. For example, the two approaches discussed below may be implemented. However, various other approaches may be implemented.

Approach 1: The terminal 201 sends to the third network entity 205 a notification message in connection with terminal 201 accessing the first network 10. For example, the notification message may indicate that terminal 201 has accessed the first network 10. The notification message may be used to trigger the third network entity 205 to issue the identifier of the first non-public network 20 and the corresponding encryption information (e.g., the encrypted security credentials for first non-public network 20) via the first network 10. For example, in response to receiving the notification message, the third network entity 205 may communicate the identifier of the first non-public network 20 and the corresponding encryption information. For the third network entity 205, the receiving the first message may comprise receiving a notification message sent by terminal 201 notifying that terminal 201 has accessed the first network 10. For example, terminal 201 may send to the third network entity 205 a notification message indicating a status of the terminal 201 as having already accessed the first network 10. The terminal 201 may send the notification message to the third network entity 205 via the application layer (e.g., in the form of an app).

Approach 2: The terminal 201 accesses a network and sends a trigger signal to the third network entity 205 via the network accessed by the terminal 201. For example, the terminal 201 may access a non-3GPP network (e.g., a WiFi network) and communicate a trigger signal via the non-3GPP network to the third network entity 205. The trigger signal may indicate that the terminal 201 has accessed the non-3GPP network. The trigger signal may be used to trigger the third network entity 205 to obtain and/or communicate the identifier of the first non-public network 20 and the corresponding encryption information (e.g., the encrypted security credentials for first non-public network 20) via the first network 10. For example, in response to receiving the trigger signal, the third network entity 205 obtains the identifier corresponding to the first non-public network and the corresponding encryption information, and communicates the identifier and encryption information (e.g., to the terminal 201 via the first network). For the third network entity, receiving the first message may comprise receiving a trigger message sent by the terminal 201 via a non-3GPP network. The trigger message may be used in connection with triggering the third network entity 205 to obtain and/or communicate the identifier of the first non-public network 20 and the corresponding encryption information via the first network 10.

After receiving the first message, the third network entity 205 invokes (e.g., initiates) a procedure of communicating (e.g., issuing) the identifier of the first non-public network 20 and the corresponding encryption information via the first network 10. For example, the identifier of the first non-public network 20 and the corresponding encryption information (e.g., the encrypted security credentials for first non-public network 20) may be packaged in or added to a second message. The second message may be communicated to the second network entity 203 in the first network 10. In response to receiving the second message, the second network entity 203 may communicate (e.g., issue) the identifier of the first non-public network 20 and the corresponding encryption information (e.g., the encrypted security credentials for first non-public network 20) to the terminal 201 such as via the first network entity 202 in the first network. The terminal may use the received identifier of the first non-public network 20 and the corresponding encryption information as a basis to perform an access operation with respect to the first non-public network 20 (e.g., the terminal sends an access request, or otherwise accesses, the first non-public network 20 corresponding to the identifier and/or the security credentials comprised in the encryption information). Optionally, in some embodiments, the third network entity 205 sends the second message directly to the second network entity 203 (e.g., as illustrated in FIG. 2A), or the third network entity 205 may send the second message to the second network entity through an NEF (e.g., fourth network entity of the first network 204). The second network entity 203 may be a control plane network entity in the core network of the first network 10. For example, the second network entity 203 may be a network entity that manages user subscription data for a network, such as a UDM in a 5G network. As another example, the second network entity 203 may be a network entity that controls and/or manages a policy for a network, such as a PCF in a 5G network. The communicating the identifier of the first non-public network 20 and the corresponding encryption information (e.g., the encrypted security credentials for first non-public network 20) to the second network entity 203 through the NEF (e.g., the fourth network entity 204) may be performed based at least in part on the use of an NEF parameter provision update message (e.g., Nnef_ParameterProvision_Update) or an NEF traffic influence update message (e.g., Nnef_TrafficInfluence_Update). An AF may send an NEF parameter provision update message or an NEF traffic influence update message to the NEF (e.g., the fourth network entity 204). The NEF parameter provision update message or the NEF traffic influence update message includes the identifier of the first non-public network 20 and the encryption information (e.g., the encrypted security credentials for first non-public network 20). After receiving the NEF parameter provision update message or the NEF traffic influence update message, the NEF (e.g., the fourth network entity 204) sends a UDM parameter provision update message (Nudm_ParameterProvision_Update) to the UDM. The message (e.g., the (Nudm_ParameterProvision_Update) includes the identifier of the first non-public network 20 and the corresponding encryption information (e.g., the encrypted security credentials for first non-public network 20). Optionally, other NEF-related messages may also be used as AF-to-NEF interface messages. The function relating to these messages sends the identifier of the first non-public network 20 and the corresponding encryption information (e.g., the encrypted security credentials for first non-public network 20) to the NEF. Various UDM-related messages may also be used as NEF-to-UDM interface messages. The various NEF-to-UDM interface messages may be used to send the identifier of the first non-public network 20 and the corresponding encryption information (e.g., the encrypted security credentials for first non-public network 20) to the UDM, and to cause the UDM to store the identifier of the first non-public network 20 and the corresponding encryption information (e.g., the encrypted security credentials for first non-public network 20).

The second network entity 203 is configured to receive a message from the third network entity 205 (e.g., the second message). According to various embodiments, the second network entity 203 processes the second message and parses out from the second message the identifier of the first non-public network 20 and the corresponding encryption information (e.g., the encrypted security credentials for first non-public network 20). The second network entity 203 may package or add the identifier of the first non-public network 20 and the corresponding encryption information (e.g., the encrypted security credentials for first non-public network 20) into a message that the second network entity 203 communicates to the first network entity 202. For example, in response to parsing out (e.g., extracting) the identifier of the first non-public network 20 and the corresponding encryption information, the second network entity may generate a fourth message comprising such an identifier and such encryption information, and communicate the fourth message to the first network entity 202 in the first network 10. The fourth message may be generated according to a communication protocol between the second network entity 203 and the first network entity 202. The fourth message (or the communicating of the identifier and corresponding encryption information) may be used in connection with causing (e.g., invoking) the first network entity 202 to communicate the identifier of the first non-public network 20 and the corresponding encryption information to the terminal 201. The terminal may use the received identifier of the first non-public network 20 and the corresponding encryption information as a basis to perform an access operation with respect to the first non-public network 20 (e.g., the terminal sends an access request, or otherwise accesses, the first non-public network 20 corresponding to the identifier and/or the security credentials comprised in the encryption information). Optionally, the first network entity 202 may be a user-configurable control plane network entity in the core network of the first network 10. For example, the first network entity 202 may be a network entity that manages user mobility and access, such as an access and mobility function (AMF) in a 5G network. The first network entity 202 may provide terminal-based authentication, authorization, registration, reachability, mobility management, and connection management functions. The first network entity 202 may be configured to operate (e.g., communicate) with terminals that implement different access technologies.

In some embodiments, the first network entity 202 is configured to receive the identifier of the first non-public network 20 and the corresponding encryption information (e.g., the encrypted security credentials for first non-public network 20) from the second network entity 203. For example, the first network entity 202 may be configured to receive the fourth message sent by the second network entity in the first network 10. The first network entity 202 may be configured to, in response to receiving the fourth message, process the fourth message and parse out (e.g., extract) the identifier of the first non-public network 20 and the corresponding encrypted information from the fourth message. In response to obtaining the identifier and the encryption information (e.g., from the fourth message), the first network entity 202 communicates the identifier and the encryption information to the terminal 201. For example, the first network entity 202 packages or adds the identifier of the first non-public network 20 and the corresponding encryption information into a message (e.g., a sixth message) to send to the terminal 201. The first network entity 202 sends the sixth message to the terminal 201 in connection with facilitating the terminal 201 to access the first non-public network 20. For example, the communication of the sixth message may cause the terminal 201 to access the first non-public network 20 in response to receiving the sixth message. The terminal 201 may access the first non-public network 20 based at least in part on the identifier of the first non-public network 20 and the corresponding encryption information. For example, the terminal 201 may determine security credentials corresponding to the first non-public network 20 based at least in part on the encryption information (e.g., by decrypting the encryption information) and may use the security credentials in connection with accessing the first non-public network 20.

According to various embodiments, the terminal 201 accesses the first non-public network based at least in part on security credentials for the first non-public network. In response to receiving the identifier of the first non-public network 20 and the corresponding encryption information, the terminal 201 may obtain the security credentials for the first non-public network. For example, terminal 201 may decrypt the encryption information (e.g., the encrypted security credentials) to obtain the security credentials for the first non-public network. Terminal 201 may store the security credentials in association with the first non-public network. For example, the terminal 201 may store the security credentials in a mapping of network identifiers to security credentials, and/or a profile associated with the first non-public network. The terminal 201 may be configured to receive the sixth message from the first network entity 202 in the first network and to parse out the identifier of the first non-public network 20 and the corresponding encryption information from the sixth message. In response to parsing out the encryption information from the sixth message, the terminal 201 decrypts the encryption information (e.g., the encrypted credentials). According to various embodiments, the terminal 201 decrypts the encryption information based at least in part on default credentials. As an example, the decryption of the encryption information may be based at least in part on public-key cryptography. As another example, the default credentials may be a pre-shared key that can decrypt the downloaded credential (e.g., the encrypted credential). The default credentials correspond to the identifier of the first non-public network. In some implementations, the encryption information is decrypted using a private key associated with terminal 201 (e.g., the first non-public network or the first network encrypted the encryption information with a public key associated with terminal 201). The terminal 201 may access the network corresponding to the identifier (e.g., the first non-public network 20) based at least in part on the security credentials. In some implementations, the encryption information is decrypted using a public key associated with terminal 201 (e.g., the first non-public network or the first network encrypted the encryption information with a private key associated with terminal 201).

According to various embodiments, the terminal 201 presets (e.g., pre-configures or otherwise defines in advance) the correspondence between the default credentials and the identifier of the non-public network (e.g., identifier for first non-public network 20). The correspondence between the default credentials and the identifier of the non-public network may comprise one or more identifiers of non-public networks and their corresponding default credentials. For example, the terminal 201 may store (e.g., locally) a mapping of default credentials to network identifiers. After obtaining the identifier of the first non-public network (e.g., by parsing out the identifier of the first non-public network 20 from the sixth message), the terminal 20 can perform a lookup to determine the default credentials to use in connection with obtaining the security credentials (e.g., to determine the default credentials to decrypt the encryption information). Terminal 201 can look up the correspondence to obtain the default credentials corresponding to the identifier of the first non-public network 20. As used herein, the "default credentials" may refer to the credential information to be used to decrypt the encryption information (e.g., encrypted security credentials). Various encryption technologies may be used to encrypt the security credentials of the first non-public network 20 (e.g., before sending the encryption information to the terminal 201). Implementations of the default credentials will also vary according to the different ways in which the security credentials are encrypted. For example, the security credentials may be encrypted using a symmetrical encryption technology, in which case the default credentials may be a key of a symmetrical encryption approach (e.g., a pre-shared key (PSK)). As another example, the security credentials may be encrypted using an asymmetrical encryption technology, in which case the default credentials may be a public key of an asymmetrical encryption technology. In some embodiments, the security credentials may also be encrypted using a private key based on an asymmetrical encryption technology to obtain the encrypted credentials. The security credentials may comprise key-related security information. For example, the security credentials may comprise a root key. As another example, the security credentials may comprise a certificate with a public-private key pair added. Various credential technologies may be implemented. For example, any credential information that enables the terminal 201 to securely access the first non-public network 20 may be implemented according to various embodiments.

According to various embodiments, a network identifier uniquely identifies the network. For example, the identifier of the first non-public network 20 may comprise information that uniquely identifiers the first non-public network 20. The identifier of the non-public network may include the public land mobile network identifier (PLMN ID) and/or the network identifier (NID). In some embodiments, the combination of the public land mobile network identifier and the network identifier is used to uniquely identify an SNPN. Optionally, the combination of the public land mobile network identifier and the network identifier may also be used to uniquely identify a PNI-NPN.

After obtaining the identifier of the first non-public network 20 and corresponding security credentials, the terminal 201 may use the identifier and security credentials of the first non-public network 20 as a basis to access the first non-public network 20. For example, terminal 201 may issue (e.g., generate and/or communicate) an access or registration request to a network entity in the first non-public network 20. The access or registration request may be generated based at least in part on the identifier and/or security credentials of the first non-public network 20. During the registration process, the terminal 201 may engage in mutual authentication with the network side based on the security credentials. The terminal 201 successfully accesses the first non-public network 20 upon passing authentication (e.g., after the first non-public network 20 authenticates terminal 201) and terminal 201 may then use services provided by the first non-public network 20. The authentication process is used in connection with determining whether the terminal 201 is a legitimate terminal vis-á-vis the network side (e.g., determining whether the terminal 201 is authorized or registered to use the services provided by the first non-public network 20). In some embodiments, terminal 201 performs an authentication of the network (e.g., the network to which the access or registration request is communicated) in connection with determining whether the network side is a legitimate network. The "network side" referred to here is the first non-public network 20.

FIG. 2B is a flowchart of a method for a terminal accessing a first non-public network in connection with a first network according to various embodiments.

As illustrated in FIG. 2B, a system for implementing process 250 may include terminal 201, a first network entity 202 corresponding to a network entity of the first network, a second network entity 203 corresponding to a network entity of the first network, a fourth network entity 204 corresponding to a network entity of the first network, and a third network entity 205 corresponding to a network entity of the first network or first non-public network. According to various embodiments, the first network described in connection with process 250 may include first network 10 of system 100 of FIG. 1 (e.g., a 5G network, a PLMN, etc.) and the first non-public network described in connection with process 250 may include first non-public network 20 of system 100 of FIG. 1 (e.g., an NPN such as an SNPN). Process 250 may be implemented at least in part by system 100 of FIG. 1, and/or computer system 500 of FIG. 5.

At 255, an identifier corresponding to a first non-public network and encryption information are obtained. 255 of process 250 may correspond to 210 of process 200 of FIG. 2A. The encryption information may include encrypted security credentials for the first non-public network. In some embodiments, the third network entity 205 obtains the identifier corresponding to the first non-public network and the encryption information.

At 260, the identifier corresponding to the first non-public network and the corresponding encryption information are communicated. 260 of process 250 may correspond to 215 of process 200 of FIG. 2A.

In some embodiments, third network entity 205 communicates the identifier corresponding to the first non-public network and the corresponding encryption information to second network entity 203. The identifier corresponding to the first non-public network and the corresponding encryption information may be communicated to the second network entity 203 in a message (e.g., referred to herein as a second message).

At 265, a request for encryption information is communicated. In some embodiments, terminal 201 communicates the request for encryption information. For example, terminal 201 communicates the request for encryption information to the first network (e.g., the first network entity 202 of the first network). The request for encryption information may be communicated to the first network entity 202 in a message (e.g., referred to herein as a fifth message).

The request for encryption information may correspond to a request for encryption information corresponding to the first non-public network. In some embodiments, the request for encryption information comprises a network identifier (e.g., the identifier corresponding to the first non-public network). For example, the request for encryption information comprises information indicating the network for which encryption information (e.g., security credentials) is requested.

In some embodiments, the request for encryption information may be communicated by the terminal 201 in response to a user inputting to the terminal 201 a selection to join/connect to a network (e.g., the first non-public network). The terminal 201 may generate the request for encryption information in response to an application (e.g., running on the terminal 201) requesting, or otherwise attempting to obtain a service from a network. The terminal 201 may communicate the request for encryption information in response to a determination that a context of the terminal 201 satisfies one or more criteria (e.g., a particular application running, a location of the terminal, and/or a current time, etc.).

The request for encryption information may cause the first network entity 202 to request the encrypted credentials of the first non-public network 20. For example, in response to receiving the request for encryption information, the first network entity 202 may communicate a request for the encryption information (e.g., the security credentials for first non-public network 20) to second network entity 203.

At 270, an identifier for obtaining the encryption information corresponding to the first non-public network is communicated.

In some embodiments, second network entity 203 communicates to the first network entity 202 the identifier for obtaining the encryption information corresponding to the first non-public network. The identifier for obtaining the encryption information corresponding to the first non-public network may be communicated to the first network entity 202 in a message (e.g., referred to herein as a third message). The identifier comprised in the third message may be used in connection with obtaining the encryption information (e.g., encrypted security credentials) corresponding to the first non-public network 20. The identifier may be sent to the first network entity 202 so that the first network entity 202 forwards the encrypted credential to the correct terminal.

In some other embodiments, first network entity 202 communicates to the second network entity 203 the identifier for obtaining the encryption information corresponding to the first non-public network. The identifier for obtaining the encryption information corresponding to the first non-public network may be communicated to the second network entity 203 in a message (e.g., referred to herein as a third message). The identifier comprised in the third message may be used in connection with obtaining the encryption information (e.g., encrypted security credentials) corresponding to the first non-public network 20. The first network entity 202 may communicate to the second network entity 203 the identifier for obtaining the encryption information corresponding to the first non-public network in response to the first network entity 202 receiving the request for encryption information (e.g., the request communicated by terminal 201 at 265).

At 275, the identifier corresponding to the first non-public network and the corresponding encryption information are communicated. 275 of process 250 may correspond to 220 of process 200 of FIG. 2A.

In some embodiments, second network entity 203 communicates the identifier corresponding to the first non-public network and the corresponding encryption information to first network entity 202. The identifier corresponding to the first non-public network and the corresponding encryption information may be communicated to the first network entity 202 in a message (e.g., referred to herein as a fourth message).

At 280, the identifier corresponding to the first non-public network and the corresponding encryption information are communicated. 280 of process 250 may correspond to 225 of process 200 of FIG. 2A. In some embodiments, first network entity 202 communicates the identifier corresponding to the first non-public network and the corresponding encryption information to terminal 201. Terminal 201 may correspond to UE 30 of system 100 of FIG. 1. The identifier corresponding to the first non-public network and the corresponding encryption information may be communicated to the terminal 201 in a message (e.g., referred to herein as a sixth message).

In some embodiments, the first network may determine that a credential corresponds to the terminal, and in response to such a determination, the first network may send the credentials (e.g., the encrypted credentials) to the terminal in an NAS message. In some embodiments, the identifier corresponding to a first non-public network and encryption information are obtained when the terminal wants to register with the first non-public network.

According to various embodiments, the terminal 201 sends the request for encryption information (e.g., to the first network entity 202) before the terminal 201 receives the identifier corresponding to the first non-public network and the corresponding encryption information (e.g., from the first network entity 202). For example, the terminal sends the fifth message to the first network entity 202 before receiving the sixth message communicated by the first network entity 202. The fifth message may comprise an identifier corresponding to a network (e.g., a network for which the terminal 201 is attempting to access). The request for the encryption information (e.g., the fifth message) may be used in connection with causing the first network entity 202 to request the encryption information (e.g., encrypted security credentials) of the first non-public network 20 from the second network entity 203. The first network entity 202 may receive the fifth message sent by the terminal 201 and in response to receiving the fifth message, the first network entity 202 may obtain the encryption information (e.g., the encrypted security credentials) and sends the third message based on the identifier for which the encryption information (e.g., the encrypted security credentials) of the first non-public network 20 is to be obtained (e.g., the network identifier comprised in, or otherwise indicated by, the fifth message). The third message may comprise a terminal identifier (e.g., an identifier that identifies terminal 201) and an identifier (e.g., a network identifier) used to obtain the encrypted credentials of the first non-public network 20. The terminal identifier may be the subscription permanent identifier (SUPI) of the terminal 201. Various other identifiers may be used to identify the terminal (e.g., a MAC address, IMEI number, an ESN number, a sim card number, etc.). With respect to the second network entity 203, the second network entity 203 may receive the identifier for obtaining the encryption information corresponding to the first non-public network (e.g., the third message) sent by the first network entity 202. In response to receiving the identifier for which the encryption information is being requested (e.g., by the terminal 201 or first network entity 202), the second network entity 203 may obtain the identifier for the first non-public network 20 and corresponding encryption information (e.g., the encrypted security credentials) and send the identifier for the first non-public network 20 and corresponding encryption information to the first network entity 202 (e.g., as a response to the third message). The fourth message may be generated based at least in part on the identifier used to obtain the encrypted security credentials of the first non-public network 20 identified in the third message. In response to the first network entity 202 receiving the identifier for the first non-public network 20 and corresponding encryption information, the first network entity 202 communicates the identifier of the first non-public network 20 and the corresponding encryption information to terminal 201 (e.g., at 280). As an example, the sixth message communicated by the first network entity 202 to terminal 201 is responsive to the fifth message communicated by terminal 201 to first network entity 202.

At 285, the encryption information is decrypted. In some embodiments, the security credentials corresponding to the first non-public network are obtained based at least in part on the decryption of the encryption information. 285 of process 250 may correspond to 230 of process 200 of FIG. 2A. In some embodiments, the terminal 201 decrypts the encryption information based at least in part on the default credentials. In response to receiving the encryption information (e.g., the sixth message), the terminal 201 may obtain the default credentials and use the default credentials to decrypt the encryption information. The terminal 201 may obtain the security credentials corresponding to the first non-public network 20 based at least in part on the decrypted encryption information.

In response to decrypting the encryption information, the terminal 201 may store the security credentials for the first non-public network in association with the identifier for the first non-public network. For example, the terminal 201 may store the security credentials for the first non-public network in a mapping of network identifiers to corresponding security credentials. In some embodiments, the terminal 201 updates or creates a network profile for the first non-public network. The network profile may be locally stored at the terminal 201 and/or may comprise settings and configurations of the first non-public network.

According to various embodiments, the terminal 201 decrypts the encryption information based at least in part on default credentials. Terminal 201 may store the default credentials in advance. The default credentials may be mapped to a particular network identifier (e.g., identifier of the first non-public network 20). As an example, the decryption of the encryption information may be based at least in part on public-key cryptography. The default credentials correspond to the identifier of the first non-public network. In some implementations, the encryption information is decrypted using a private key associated with terminal 201 (e.g., the first non-public network or the first network corresponding to the encrypted the encryption information is associated with a public key associated with terminal 201).

At 290, the first non-public network is accessed. 290 of process 250 may correspond to 235 of process 200 of FIG. 2A. In some embodiments, terminal 201 accesses the first non-public network after (e.g., in response to) the encryption information being decrypted. The terminal 201 may access the first non-public network based at least in part on the identifier corresponding to the first non-public network and the corresponding security credentials (e.g., the decrypted encryption information). For example, terminal 201 may use the identifier corresponding to the first non-public network and/or the corresponding security credentials in connection with an authentication of the terminal 201 with the first non-public network.

According to various embodiments, 295 is optionally included.

At 295, the first network is deregistered. In some embodiments, the terminal 201 deregisters the first network 10. For example, in response to connecting to, or otherwise accessing, the first non-public network, the terminal 201 may determine to deregister with the first network 10. In some embodiments, the terminal 201 and/or the first network entity 202 may invoke a deregistration protocol and communicate in connection with performing a deregistration of the terminal 201 with the first network 10.

According to various embodiments, the procedure of deregistering the first network 10 comprises: the terminal 201 issuing (e.g., generating and communicating) a deregistration request to the first network entity 202; the first network entity 202 generating a deregistration accept message in response to receiving the deregistration request and communicating the deregistration accept message to the terminal 201; and the terminal 201 receiving a deregistration accept message sent back by the first network entity 202. In response to the first network entity 202 receiving the deregistration request from the terminal 201, the first network entity 202 may operatively update a registration of the first network entity 202 in connection with deregistering the terminal 201. Optionally, before accessing the first non-public network 20, the terminal 201 may initiate the procedure of deregistering the first network 10. After completing the procedure of deregistering the first network 10, the terminal 201 may initiate the procedure of accessing the first non-public network 20. For example, the terminal 201 may initiate the procedure of accessing the first non-public network 20 in response to receiving the deregistration accept message from the first network entity 202 or otherwise in response to deregistering with the first network 10. In some embodiments, if the terminal 201 supports simultaneous access of two or more networks, the terminal 201 may initiate the procedure of deregistering the first network 10 prior to accessing the first non-public network 20, or the terminal 201 may initiate the procedure of deregistering the first network 10 while (e.g., contemporaneously with) initiating the procedure of accessing the first non-public network 20 or after accessing the first non-public network 20. FIG. 2B an example according to which the terminal 201 initiates the procedure of deregistering the first network 10 after accessing the first non-public network 20, however, various embodiments are not limited to this.

The examples of procedures for accessing a first non-public network depicted in FIGS. 2A and 2B are merely generalized procedures of technical schemes of the present application. The procedures of the overall schemes will vary in terms of the implemented details according to different implementations of the first network entity, second network entity, and third network entity. For example, the communication procedures and the first through sixth messages will vary in how such procedures and/or messages are implemented. In some embodiments, the security credentials of the first non-public network 20 may be encrypted and stored in the first network 10 (e.g., on a UDM network entity in a PLMN). Moreover, the security credentials of the first non-public network 20 may be sent to the terminal 201 via the control plane communication procedure of the terminal 201 and the core network. The control plane interactive procedures of the terminal 201 and the core network include, but are not limited to: registration procedures, deregistration procedures, service request procedures, UE parameter updates via UDM control plane procedures, PDU session establishment procedures, PDU session modification procedures, and PDU session release procedures. According to various embodiments, a suitable control plane interactive procedure may be selected from among control plane interactive procedures of the terminal 201 and the core network, to modify the selected control plane interactive procedure, and then to issue the encrypted credentials of the first non-public network 20 to the terminal 201 via a network entity in the control plane interactive procedure.

The following is an illustrative description of the interactive procedure illustrated in FIGS. 3A through 3D, of the process of issuing security credentials of the first non-public network 20 to the terminal 301 in an interactive procedure between different control planes using the example of an SNPN for the first non-public network 20.

Figure 3A:
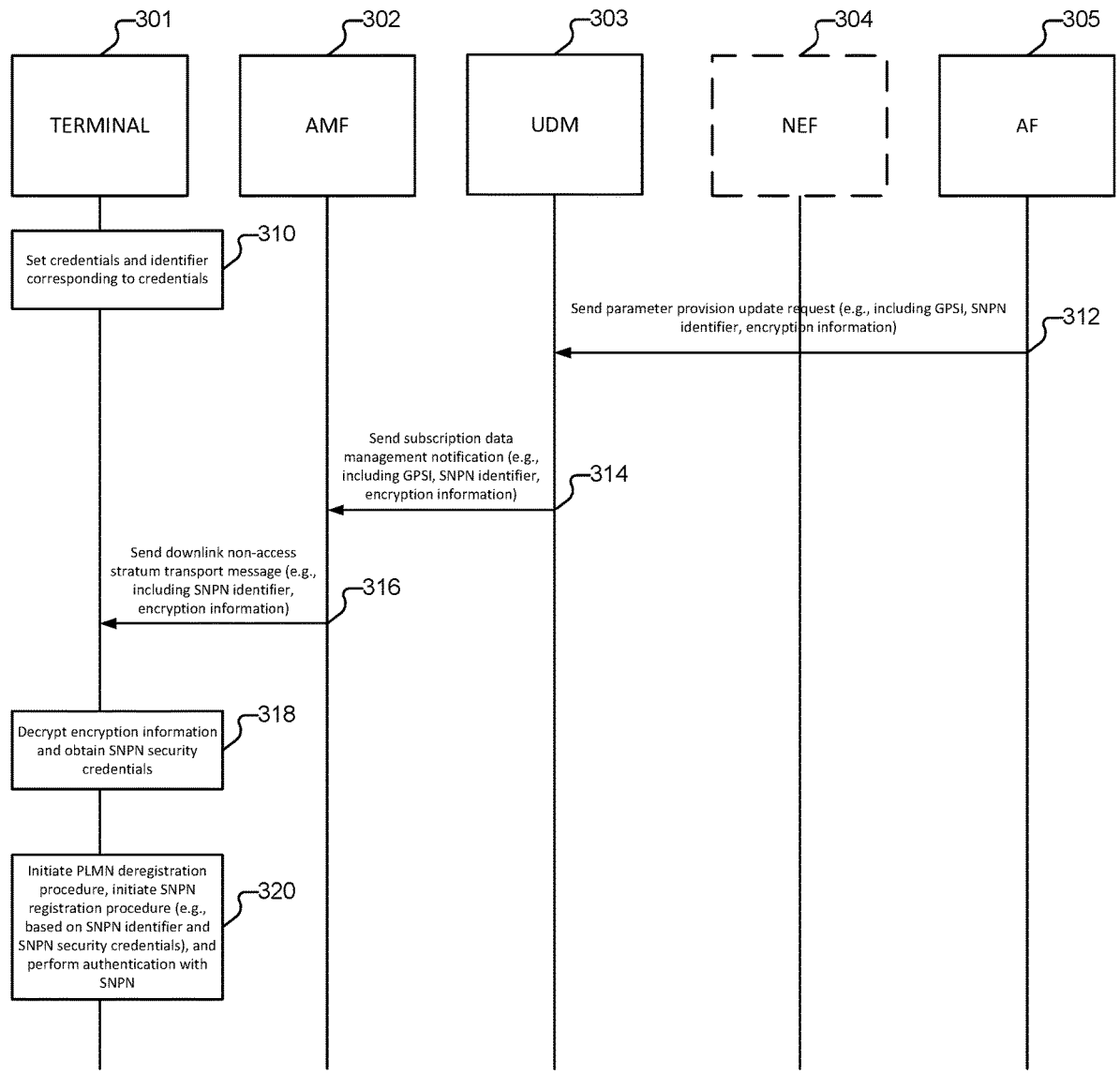
FIG. 3A is a flowchart of a method for sending security credentials of a first non-public network using a terminal parameter update procedure in connection with providing information to a terminal for the terminal to access the first non-public network according to various embodiments of the present application.

FIG. 3A is a flowchart of a method for sending security credentials of a first non-public network using a terminal parameter update procedure in connection with providing information to a terminal for the terminal to access the first non-public network according to various embodiments of the present application.

As illustrated in FIG. 3A, a system for implementing process 300 may include terminal 301, an AMF 302, a UDM 303, an NEF 304, and an AF 305. According to various embodiments, the first network described in connection with process 300 may include first network 10 of system 100 of FIG. 1 (e.g., a 5G network, a PLMN, etc.), and the first non-public network described in connection with process 300 may include first non-public network 20 of system 100 of FIG. 1 (e.g., an NPN such as an SNPN). Process 300 may be implemented at least in part by system 100 of FIG. 1, and/or computer system 500 of FIG. 5.

At 310, credentials and an identifier corresponding to credentials are set. In some embodiments, the terminal 301 presets or pre-defines credentials. The credentials may be defined by an administrator of the terminal 301 (e.g., an administrator of a network or an organization associated with terminal 301). The credentials may be default credentials. According to various embodiments, the terminal 301 presets default credentials and an SNPN identifier corresponding to the default credentials. The SNPN identifier may comprise a PLMN ID and/or a network interface device (NID). In some embodiments, the default credentials are shared with a corresponding non-public network. For example, the non-public network may be provided with a public key (e.g., with which encryption information such as security credentials may be encrypted before sending to the terminal).

At 312, a parameter provision update request is communicated. In some embodiments, AF 305 sends the parameter provision update request (e.g., a Nudm_ParameterProvision_Update request) to UDM 303. The parameter provision update request may be communicated to the UDM 303 via NEF 304. The parameter provision update request may include the generic public subscription identifier (GPSI), the SNPN identifier, and the corresponding encryption information (e.g., encrypted security credentials). The GPSI may be an identifier associated with terminal 301 (e.g., to ensure that the encryption information is sent to the terminal 301).

At 314, a subscription data management notification is communicated. In some embodiments, UDM 303 sends the subscription data management notification message (e.g., Nudm_SDM_Notification Notify message) to AMF 302. In some embodiments, the subscription data management notification may include the SUPI, the SNPN identifier, and the corresponding encryption information (e.g., encrypted security credentials). In some embodiments, the subscription data management notification may include the GPSI, the SNPN identifier, and the corresponding encryption information (e.g., encrypted security credentials). UDM 303 may send the subscription data management notification in response to receiving the parameter provision update request.

At 316, a downlink non-access stratum transport message is communicated. In some embodiments, AMF 302 communicates the downlink non-access stratum transport message (e.g., a DL NAS TRANSPORT message) to the terminal 301. AMF 302 may communicate the downlink non-access stratum transport message in response to receiving the subscription data management notification, or otherwise in response to obtaining the SNPN identifier and the corresponding encryption information from the subscription data management notification. According to various embodiments, the downlink non-access stratum transport message comprises the SNPN identifier and/or corresponding encryption information (e.g., the encrypted security credentials).

At 318, the encryption information is decrypted and the corresponding security credentials are obtained. In some embodiments, in response to receiving the downlink non-access stratum transport message, the terminal 301 obtains the encryption information therefrom and decrypts the encryption information.

The terminal 301 may obtain the security credentials for the first non-public network based at least in part on decrypting the encryption information.

In response to decrypting the encryption information, the terminal 301 may store the security credentials for the first non-public network in association with the identifier for the network (e.g., the first non-public network). For example, the terminal 301 may store the security credentials for the first non-public network in a mapping of network identifiers to corresponding security credentials. In some embodiments, the terminal 301 updates or creates a network profile for the first non-public network. The network profile may be locally stored at the terminal 301 and/or may comprise settings and configurations of the first non-public network.

According to various embodiments, the terminal 301 decrypts the encryption information based at least in part on default credentials. Terminal 301 may store the default credentials in advance. The default credentials may be mapped to a particular network identifier (e.g., identifier of the first non-public network 20). As an example, the decryption of the encryption information may be based at least in part on public-key cryptography. The default credentials are associated with the identifier of the first non-public network. In some implementations, the encryption information is decrypted using a private key associated with terminal 301 (e.g., the first non-public network or the first network encrypted the encryption information with a public key associated with terminal 301).

At 320, a PLMN deregistration procedure is initiated, an SNPN registration procedure is initiated, and an authentication with the SNPN is initiated. In some embodiments, in response to obtaining the security credentials corresponding to the non-public network (e.g., the SNPN security credentials), the terminal 301 initiates deregistration from the public network (e.g., the PLMN deregistration) and initiates accessing, or connection with, the non-public network associated with the security credentials. The accessing or connecting with the non-public network may comprise registering and/or authenticating with the SNPN based at least in part on the SNPN identifier and the SNPN security credentials.

According to various embodiments, the AF 305 function is an implementation of the third network entity (e.g., third network entity 205 of FIGS. 2A and 2B), the UDM 303 is an implementation of the second network entity (e.g., second network entity 203 of FIGS. 2A and 2B), and the AMF 302 is an implementation of the first network entity (e.g., first network entity 202 of FIGS. 2A and 2B). Correspondingly, the Nudm_ParameterProvision_Update request message at 312 is an implementation of the second message of process 200 of FIG. 2A and/or process 250 of FIG. 2B, the Nudm SDM_Notification Notify message at 314 is an implementation of the fourth message of process 200 of FIG. 2A and/or process 250 of FIG. 2B, and the DL NAS TRANSPORT message at 316 is an implementation of the sixth message of process 200 of FIG. 2A and/or process 250 of FIG. 2B.

In some embodiments, the GPSI is an identifier of terminal 301. For example, the GPSI included in the parameter provision update request at 312 corresponds to an identifier associated with terminal 301. The GPSI may be the mobile phone number used by terminal 301 or domain name information. The GPSI of the terminal may correspond, or otherwise be associated with, the SUPI associated with the terminal. The SNPN identifier (e.g., the SNPN identifier included in the parameter provision update request at 312) indicates the SNPN, and the encryption information corresponds to a result of encrypting the security credentials of the SNPN.

At 312, the AF 305 may directly send the parameter provision update request (e.g., the Nudm_ParameterProvision_Update request) message to the UDM 303, or the AF 305 may provide the UDM 303 with the parameter provision update request via the NEF 304. As illustrated in FIG. 3A, the dashed-line box for NEF 304 indicates that the NEF 304 is an optional network entity.

Figure 3B:
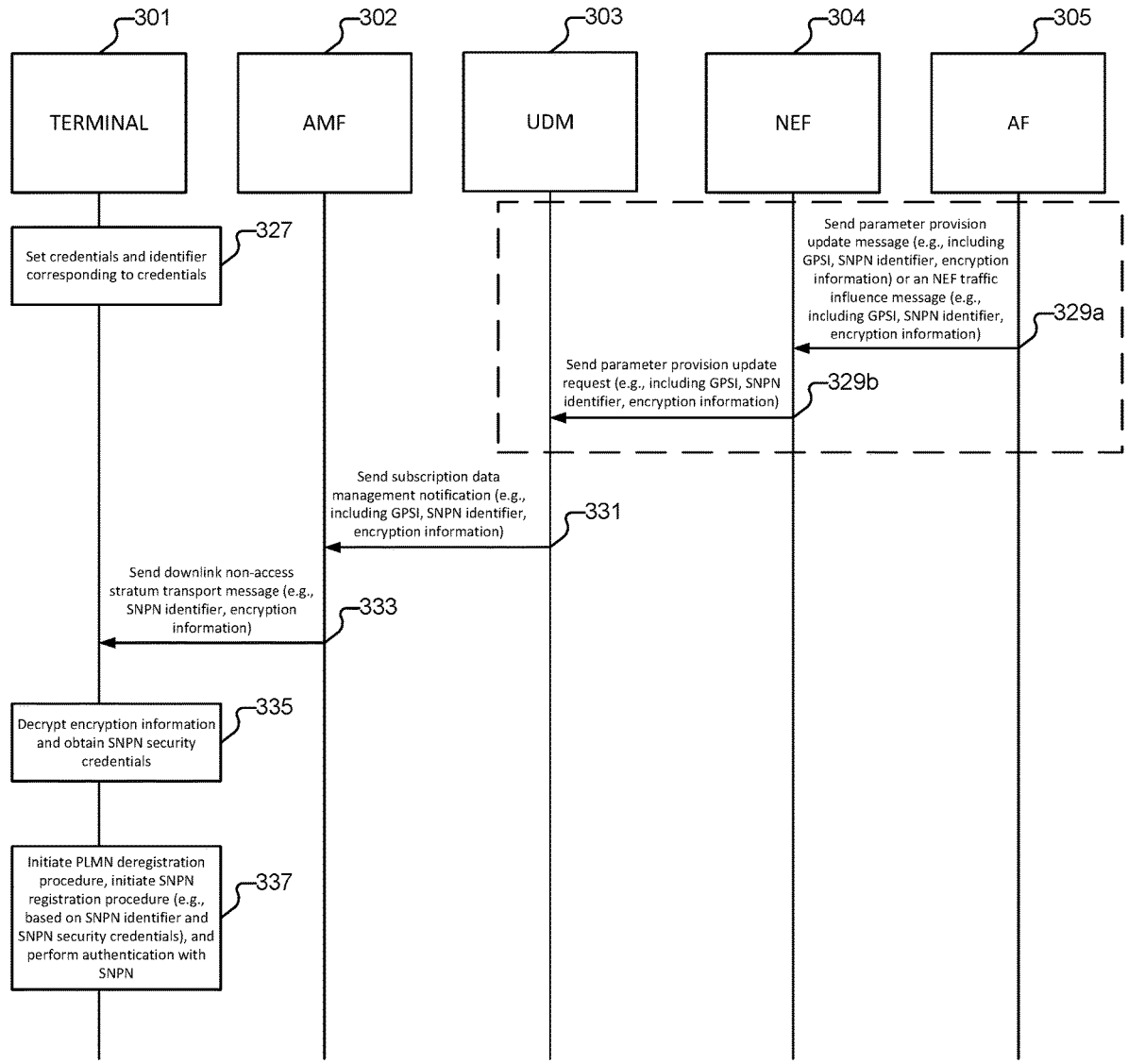
FIG. 3B is a flowchart of a method for using a terminal parameter update procedure in connection with providing information to a terminal for the terminal to access the first non-public network according to various embodiments of the present application.

FIG. 3B is a flowchart of a method for using a terminal parameter update procedure in connection with providing information to a terminal for the terminal to access the first non-public network according to various embodiments of the present application.

As illustrated in FIG. 3B, a system for implementing process 325 may include terminal 301, an AMF 302, a UDM 303, an NEF 304, and an AF 305. According to various embodiments, the first network described in connection with process 325 may include first network 10 of system 100 of FIG. 1 (e.g., a 5G network, a PLMN, etc.), and the first non-public network described in connection with process 325 may include first non-public network 20 of system 100 of FIG. 1 (e.g., an NPN such as an SNPN). Process 325 may be implemented at least in part by system 100 of FIG. 1, and/or computer system 500 of FIG. 5.

As illustrated in FIG. 3B, the AF 305 may provide the UDM 303 with the GSPI, SNPN identifier, and/or encryption information via the NEF 304.

At 327, credentials and an identifier corresponding to credentials are set. In some embodiments, the terminal 301 presets or pre-defines credentials. The credentials may be defined by an administrator of the terminal 301 (e.g., an administrator of a network or an organization associated with terminal 301). The credentials may be default credentials. According to various embodiments, the terminal 301 presets default credentials and an SNPN identifier corresponding to the default credentials. The SNPN identifier may comprise a PLMN ID and/or a network interface device (NID). In some embodiments, the default credentials are shared with a corresponding non-public network. For example, the non-public network may be provided with a public key (e.g., with which encryption information such as security credentials may be encrypted before sending to the terminal).

At 329a, a parameter provision update message or an NEF traffic influence update message is communicated. The AF 305 may communicate the parameter provision update message (e.g., an Nnef_ParameterProvision_Update message, or an Nnef_TrafficInfluence_Update message) to the NEF 304. In some embodiments, the parameter provision update message comprises the generic public subscription identifier (GPSI), the SNPN identifier, and the corresponding encryption information (e.g., encrypted security credentials).

At 329b, a parameter provision update request is communicated. In some embodiments, NEF 304 sends the parameter provision update request (e.g., a Nudm_ParameterProvision_Update request) to UDM 303. NEF 304 may send the parameter provision update request to UDM 303 in response to NEF 304 receiving the parameter provision update message from AF 305. For example, the NEF 304 obtains the generic public subscription identifier (GPSI), the SNPN identifier, and the corresponding encryption information (e.g., encrypted security credentials) from the parameter provision update message, generates the parameter provision update request based at least in part on the GPSI, SNPN identifier, and/or corresponding encryption information, and sends the parameter provision update request to UDM 303. The parameter provision update request may include the GPSI, the SNPN identifier, and the corresponding encryption information (e.g., encrypted security credentials).

According to various embodiments, 329a and 329b of process 325 of FIG. 3B collectively correspond to 312 of process 300 of FIG. 3A. For example, 329a and 329b collectively communicate the GPSI, SNPN identifier, and/or the corresponding encryption information to the UDM 303 similar to 312 of process 300.

At 331, a subscription data management notification is communicated. In some embodiments, UDM 303 sends the subscription data management notification message (e.g., Nudm_SDM_Notification Notify message) to AMF 302. 331 of process 325 may correspond to, or is similar to, 314 of process 300 of FIG. 3A. In some embodiments, the subscription data management notification may include the SUPI, the SNPN identifier, and the corresponding encryption information (e.g., encrypted security credentials). In some embodiments, the subscription data management notification may include the GPSI, the SNPN identifier, and the corresponding encryption information (e.g., encrypted security credentials). UDM 303 may send the subscription data management notification in response to receiving the parameter provision update request.

In response to receiving the parameter provision update request (e.g., the Nudm_ParameterProvision_Update request message), UDM 303 may parse out the GPSI, the SNPN identifier, and/or the corresponding encrypted information from the parameter provision update request. The UDM 303 may generate the subscription data management notification based at least in part on the GPSI, the SNPN identifier, and/or the corresponding encrypted information. For example, UDM 303 may use a correspondence between the GPSI and the SUPI to map the GPSI associated with terminal 301 to the SUPI associated with terminal 301. UDM 303 may perform a lookup with respect to a mapping of GPSIs to SUPIs to determine a SUPI for a terminal associated with the GPSI. The GPSI or the SUPI may be used to uniquely identify the terminal 301. UDM 303 packages or adds the SUPI, the SNPN identifier, and the corresponding encryption information into the subscription data management notification message (e.g., Nudm_SDM_Notification Notify message), and sends the subscription data management notification message to the AMF 302.

At 333, a downlink non-access stratum transport message is communicated. In some embodiments, the AMF 302 communicates the downstream non-access stratum transport message to the terminal 301. 333 of process 325 may correspond to, or be similar to, 316 of process 300 of FIG. 3A.

According to various embodiments, in response to AMF 302 receiving the subscription data management notification, the AMF may obtain an identifier associated with terminal 301 (e.g., the SUPI), the SNPN identifier, and the corresponding encryption information, and generate the downlink non-access stratum transport message based at least in part on the identifier associated with terminal 301 (e.g., the SUPI), the SNPN identifier, and the corresponding encryption information. For example, the AMF 302 parses out the SUPI (or GPSI or other identifier associated with a terminal), the SNPN identifier, and the corresponding encryption information from the subscription data management notification message (e.g., the Nudm_SDM_Notification Notify message). AMF 302 may package or add the SNPN identifier and the corresponding encryption information into the DL NAS TRANSPORT message and may use the SUPI as a basis to send the DL NAS TRANSPORT message to the corresponding terminal (e.g., terminal 301).

At 335, the encryption information is decrypted and the corresponding security credentials are obtained. 335 of process 325 may correspond to, or be similar to, 318 of process 300 of FIG. 3A. In some embodiments, in response to receiving the downlink non-access stratum transport message, the terminal 301 obtains the encryption information therefrom and decrypts the encryption information.

The terminal 301 may obtain the security credentials for the non-public network based at least in part on decrypting the encryption information. The terminal 301 may determine the network with which the security credentials are associated based at least in part on the identifier of the network (e.g., the SNPN) communicated in connection with the downlink non-access stratum transport message.

In response to decrypting the encryption information, the terminal 301 may store the security credentials for the non-public network in association with the identifier for the network (e.g., the SNPN identifier). For example, the terminal 301 may store the security credentials for the non-public network in a mapping of network identifiers to corresponding security credentials. In some embodiments, the terminal 301 updates or creates a network profile for the non-public network corresponding to the SNPN identifier. The network profile may be locally stored at the terminal 301 and/or may comprise settings and configurations of the non-public network.

According to various embodiments, the terminal 301 decrypts the encryption information based at least in part on default credentials. The default credentials may be mapped to a particular network identifier (e.g., identifier of the first non-public network 20). As an example, the decryption of the encryption information may be based at least in part on public-key cryptography. The default credentials are associated with the identifier of the first non-public network. In some implementations, the encryption information is decrypted using a private key associated with terminal 301 (e.g., the first non-public network or the first network encrypted the encryption information with a public key associated with terminal 301).

In response to receiving the downlink non-access stratum transport message (e.g., the DL NAS TRANSPORT message), terminal 301 parses out the SNPN identifier and the corresponding encrypted information from the downlink non-access stratum transport message. Terminal 301 may look up the preset default credentials and the SNPN identifier corresponding to the default credentials and may use the default credentials corresponding to the received SNPN identifier to decrypt the encrypted credentials and obtain the security credentials for the SNPN.

At 337, a PLMN deregistration procedure is initiated, an SNPN registration procedure is initiated, and an authentication with the SNPN is initiated. 337 of process 325 may correspond to, or be similar to, 320 of process 300 of FIG. 3A. In some embodiments, in response to obtaining the security credentials corresponding to the non-public network (e.g., the SNPN security credentials), the terminal 301 initiates deregistration from the public network (e.g., the PLMN deregistration) and initiates accessing, or connection with, the non-public network associated with the security credentials. The accessing or connecting with the non-public network may comprise registering and/or authenticating with the SNPN based at least in part on the SNPN identifier and the corresponding security credentials such as the SNPN security credentials.

According to various embodiments, there is no restriction on the chronological order in which the PLMN deregistration procedure and the SNPN registration procedure or authentication of the SNPN (e.g., both of which may be initiated by the terminal 301) are performed. The order in which the PLMN deregistration procedure and the SNPN registration procedure or authentication of the SNPN are performed may be determined according to the communication capabilities of the terminal 301.

According to various embodiments, by modifying the terminal (e.g., UE) parameter update procedure, reusing a portion of the messages in the terminal parameter update procedure, and communicating or issuing the encrypted credentials to the terminal based at least in part on communication among network entities such as the UDM 303 and the AMF 302 in the PLMN core network, the terminal 301 is enabled to decrypt the SNPN security credentials therefrom and to successfully access the SNPN with the SNPN security credentials. The encryption of the SNPN security credentials and the communication thereof via the public network (e.g., the various network entities of the public network) improve SNPN security requirements (e.g., improve the configuring of the connection to, or accessing of, the SNPN by the terminal).

Figure 3C:
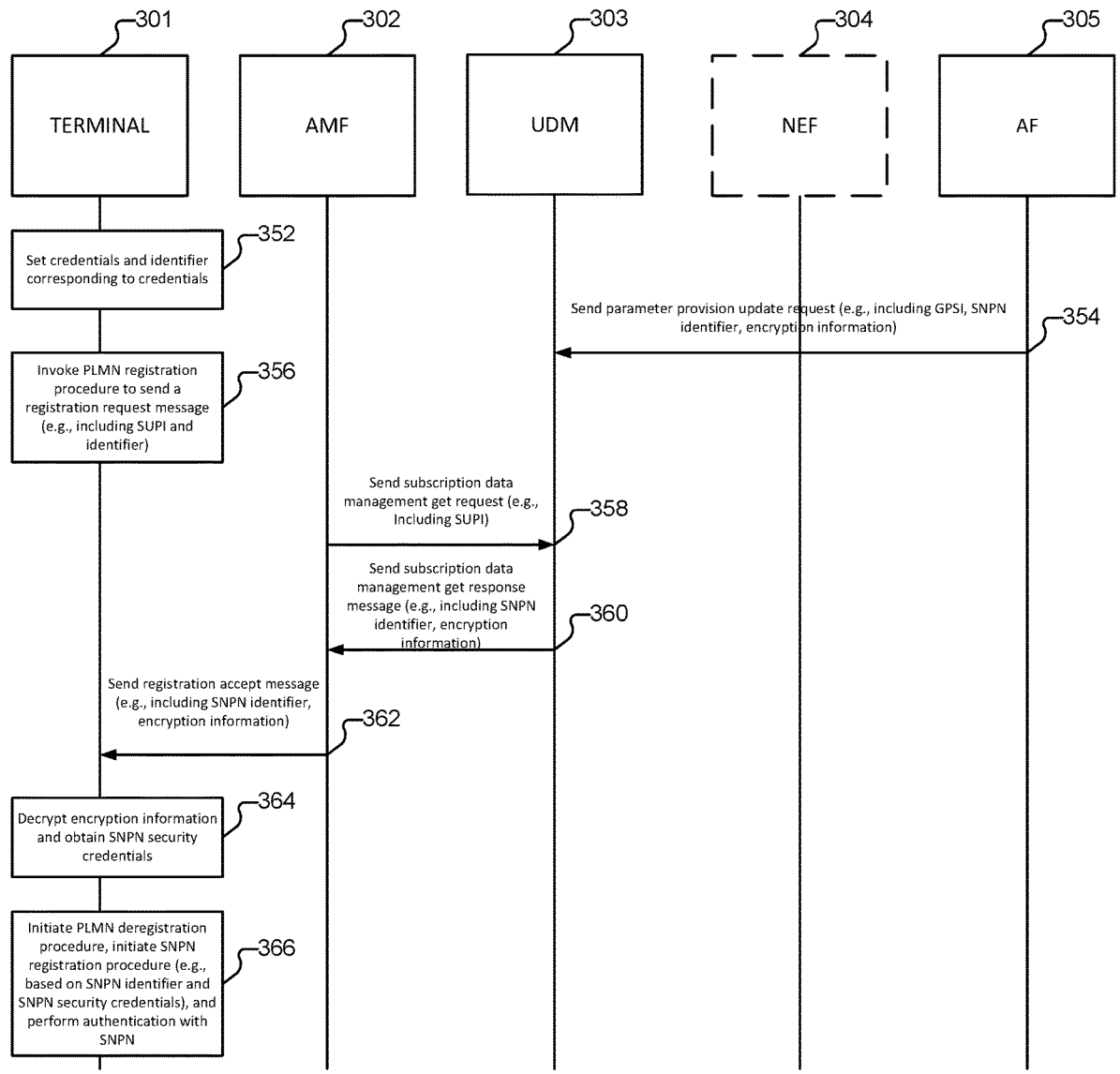
FIG. 3C is a flowchart of a method for using a terminal registration procedure in connection with providing information to a terminal for the terminal to access the first non-public network according to various embodiments of the present application.

FIG. 3C is a flowchart of a method for using a terminal registration procedure in connection with providing information to a terminal for the terminal to access the first non-public network according to various embodiments of the present application.

As illustrated in FIG. 3C, a system for implementing process 350 may include terminal 301, an AMF 302, a UDM 303, an NEF 304, and an AF 305. According to various embodiments, the first network described in connection with process 350 may include first network 10 of system 100 of FIG. 1 (e.g., a 5G network, a PLMN, etc.), and the first non-public network described in connection with process 350 may include first non-public network 20 of system 100 of FIG. 1 (e.g., an NPN such as an SNPN). Process 350 may be implemented at least in part by system 100 of FIG. 1, and/or computer system 500 of FIG. 5.

According to various embodiments, terminal 301 is provided with the security credentials corresponding to a non-public network via a terminal (e.g., UE) registration procedure. In response to receiving the security credentials, the terminal may register with and/or access the non-public network.

At 352, credentials and an identifier corresponding to credentials are set. In some embodiments, the terminal 301 presets or pre-defines credentials. 352 of process 350 may correspond to, or be similar to, 310 of process 300 of FIG. 3A and/or 327 of process 325 of FIG. 3B. The credentials may be defined by an administrator of the terminal 301 (e.g., an administrator of a network or an organization associated with terminal 301). The credentials may be default credentials. According to various embodiments, the terminal 301 presets default credentials and an SNPN identifier corresponding to the default credentials (e.g., the terminal 301 associates the SNPN identifier with the default credentials). The SNPN identifier may comprise a PLMN ID and/or a network interface device (NID). Various other network identifiers may be implemented. In some embodiments, the default credentials are shared with a corresponding non-public network. For example, the non-public network may be provided with a public key (e.g., with which encryption information such as security credentials may be encrypted before sending to the terminal).

At 354, a parameter provision update request is communicated. 354 of process 350 may correspond to, or be similar to, 312 of process 300 of FIG. 3A. In some embodiments, AF 305 sends the parameter provision update request (e.g., a Nudm_ParameterProvision_Update request) to UDM 303. The parameter provision update request may be communicated to the UDM 303 via NEF 304. The parameter provision update request may include the generic public subscription identifier (GPSI), the SNPN identifier, and the corresponding encryption information (e.g., encrypted security credentials). The GPSI may be an identifier associated with terminal 301 (e.g., to ensure that the encryption information is sent to the terminal 301).

At 356, a PLMN registration procedure is invoked. The PLMN registration procedure may be invoked at terminal 301. For example, the PLMN registration procedure may be invoked in response to a user (or administrator of terminal 301) inputting a selection to initiate the PLMN registration procedure. The terminal 301 may communicate the request for encryption information in response to a determination that a context of the terminal 301 satisfies one or more criteria (e.g., a particular application running, a location of the terminal, and/or a current time, etc.). As an example, the terminal 301 may invoke the PLMN registration procedure in response to an application (e.g., running on the terminal 301) requesting, or otherwise attempting, to obtain a service from a network. As another example, the terminal 301 may invoke the PLMN registration procedure in response to a request (or an attempt) to connect to, or access, the non-public network.

In response to invoking the PLMN registration procedure, the terminal 301 may send a registration request message to the public network (e.g., to AMF 302). According to various embodiments, the registration request message may comprise the SUPI and an identifier used to obtain the encryption information (e.g., the encrypted security credentials) corresponding to an SNPN. The identifier used to obtain the encryption information (e.g., the encrypted security credentials) corresponding to an SNPN may be an SNPN identifier (e.g., an identifier associated with the non-public network).

At 358, a subscription data management get request is communicated. In some embodiments, AMF 302 communicates to UDM 303 the identifier for obtaining the encryption information corresponding to the non-public network. The identifier for obtaining the encryption information corresponding to the non-public network (e.g., the SUPI) may be communicated to the UDM 303 in a message (e.g., a subscription data management get (Nudm_SDM_Get) request message). The identifier (e.g., the SUPI) comprised in the subscription data management request may be used in connection with obtaining the encryption information (e.g., encrypted security credentials) corresponding to the non-public network. The AMF 302 may communicate to the UDM 303 the identifier for obtaining the encryption information corresponding to the non-public network in response to AMF 302 receiving the registration request message from the terminal 301 (e.g., the message communicated by terminal 301 at 356).

At 360, a subscription data management get response message is communicated. 360 of process 350 may correspond to, or be similar to, 275 of process 250 of FIG. 2B. In some embodiments, UDM 303 sends the subscription data management get response message (e.g., a Nudm_SDM_Get message) to the AMF 302 in response to the subscription data management get request. The subscription data management get response message may comprise the SNPN identifier and corresponding encryption information (e.g., the encrypted security credentials). The subscription data management get response message may comprise the GPSI or other identifier corresponding to the terminal 301.

At 362, a registration accept message is communicated. 362 may correspond to, or be similar to, 280 of process 250 of FIG. 2B. In some embodiments, AMF 302 sends the registration accept message to terminal 301 in response to the AMF 302 receiving the subscription data management response message. The registration accept message may comprise the SNPN identifier and corresponding encryption information.

At 364, the encryption information is decrypted and the corresponding security credentials are obtained. 364 of process 350 may correspond to, or be similar to, 318 of process 300 of FIG. 3A and/or 335 of process 325 of FIG. 3B. In some embodiments, in response to receiving the registration accept message, the terminal 301 obtains the encryption information therefrom and decrypts the encryption information.

The terminal 301 may obtain the security credentials for the non-public network based at least in part on decrypting the encryption information. The terminal 301 may determine the network with which the security credentials are associated based at least in part on the identifier of the network (e.g., the SNPN identifier) communicated in connection with the registration accept message.

In response to decrypting the encryption information, the terminal 301 may store the security credentials for the non-public network in association with the identifier for the network (e.g., the SNPN). For example, the terminal 301 may store the security credentials for the non-public network in a mapping of network identifiers to corresponding security credentials. In some embodiments, the terminal 301 updates or creates a network profile for the non-public network corresponding to the SNPN identifier. The network profile may be locally stored at the terminal 301 and/or may comprise settings and configurations of the non-public network.

According to various embodiments, the terminal 301 decrypts the encryption information based at least in part on default credentials. The default credentials may be mapped to a particular network identifier (e.g., identifier of the first non-public network 20). As an example, the decryption of the encryption information may be based at least in part on public-key cryptography. The default credentials are associated with the identifier of the first non-public network. In some implementations, the encryption information is decrypted using a private key associated with terminal 301 (e.g., the first non-public network or the first network encrypted the encryption information with a public key associated with terminal 301).

At 366, a PLMN deregistration procedure is initiated, an SNPN registration procedure is initiated, and an authentication with the SNPN is initiated. 366 of process 350 may correspond to, or be similar to, 320 of process 300 of FIG. 3A and/or 337 of process 325 of FIG. 3B. In some embodiments, in response to obtaining the security credentials corresponding to the non-public network (e.g., the SNPN security credentials), the terminal 301 initiates deregistration from the public network (e.g., the PLMN deregistration) and initiates accessing, or connection with, the non-public network associated with the security credentials. The accessing or connecting with the non-public network may comprise registering and/or authenticating with the SNPN based at least in part on the SNPN identifier and the corresponding security credentials such as the SNPN security credentials.

According to various embodiments, the AF 305 function is an implementation of the third network entity 205, the UDM 303 is an implementation of the second network entity 203, and the AMF 302 is an implementation of the first network entity 202. Correspondingly, the Nudm_ParameterProvision_Update request message at 354 is an implementation of the second message, the Nudm_SDM_Get request message at 358 is an implementation of the third message, the Nudm_SDM_Get response message at 360 is an implementation of the fourth message, the registration request message in 356 is an implementation of the fifth message, and/or the registration accept message at 362 is an implementation of the sixth message.

According to various embodiments, the AF 305 may directly send the Nudm_ParameterProvision_Update request message to the UDM, or the AF 305 may access the UDM 303 (e.g., send the message to the UDM 303) via the NEF 304. As illustrated in FIG. 3C, the dashed-line box indicates that the NEF 304 is an optional network entity. Specifically, the AF 305 may access the UDM 303 through the NEF 304 based at least in part on use of an NEF parameter provision update message (Nnef_ParameterProvision_Update) or an NEF traffic influence update message (Nnef_TrafficInfluence_Update). The AF 305 may first send an NEF parameter provision update message or an NEF traffic influence update message to the NEF 304. The message may include the GPSI, the SNPN identifier, and the corresponding encryption information (e.g., encrypted security credentials such as credentials for the non-public network). After receiving the NEF parameter provision update message or the NEF traffic influence update message, the NEF 304 may send a UDM parameter provision update message (Nudm_ParameterProvision_Update) to the UDM. The message may include the GPSI, the SNPN identifier, and/or the corresponding encryption information. FIG. 3B provides a graphic presentation of such a procedure. There will be no further illustrations presented in the present embodiment.

At 356 of process 350, the terminal 301 triggers a PLMN registration procedure. For the detailed steps of this registration procedure, one may refer to the requirements of applicable communications standard(s), the entireties of which are hereby incorporated herein. No restriction is imposed here. According to various embodiments, terminal 301 may send a registration request message to the AMF 302 in connection with registering with the PLMN. Such a message may include the SUPI and the identifier used in connection with obtaining the SNPN encryption information (e.g., encrypted security credentials). The SUPI may be used in connection with uniquely identifying the terminal 301, and the identifier used to acquire the SNPN encryption information may be used in connection with triggering the AMF 302 to request the encryption information from the UDM 303. At 358, the AMF 302 may receive the registration request message sent by the terminal 301 and parses out the SUPI and the identifier used in connection with obtaining the SNPN encryption information from the registration request message. AMF 302 may use the identifier used in connection with obtaining the SNPN encryption information as a basis to package or add the SUPI into the Nudm_SDM_Get request message, which AMF 302 sends to the UDM 303 in order to request the encryption information from the UDM 303. At 360, the UDM 303 may parse out the SUPI from the Nudm_SDM_Get request message. UDM 303 may use the correspondence between the GPSI and the SUPI as a basis to map the SUPI of terminal 301 to the GPSI of terminal 301, and then UDM 303 may obtain the SNPN identifier corresponding to the terminal 301 and the corresponding encryption information. UDM 303 may package or add the SNPN identifier and the corresponding encryption information into the Nudm_SDM_Get response message, which UDM 303 sends to the AMF 302. At 362, the AMF 302 may parse out the SNPN identifier and the corresponding encryption information from the Nudm_SDM_Get response message. AMF 302 may package or add the SNPN identifier and the corresponding encryption information into the registration accept message, which AMF 302 sends to the terminal 301 that initiated the registration request. At 364, the terminal 301 parses out the SNPN identifier and the corresponding encrypted credentials from the registration accept message. Terminal 301 may look up the preset default credentials and the SNPN identifier corresponding to the default credentials, and may use the default credentials corresponding to the received SNPN identifier to decrypt the encryption information, and terminal 301 may obtain the SNPN security credentials. At 366, terminal 301 may initiate the PLMN deregistration procedure on the one hand while initiating the SNPN registration procedure based on the SNPN identifier and SNPN security credentials on the other, and may complete authentication with this SNPN. At 366, there is no restriction on the chronological order in which the PLMN deregistration procedure and the SNPN registration procedure (e.g., both initiated by the terminal 301) occur. The order in which the PLMN deregistration procedure and the SNPN registration procedure or authentication of the SNPN are performed may be determined according to the communication capabilities of the terminal 301.

According to various embodiments, by modifying the PLMN-oriented registration procedure for terminal 301, reusing a portion of the messages in the registration procedure, and issuing or communicating the encrypted security credentials to the terminal with help from network entities such as the UDM 303 and the AMF 302 in the PLMN core network, the terminal 301 is enabled to decrypt the SNPN security credentials therefrom and to successfully access the SNPN based at least in part on the SNPN security credentials. The encryption of the SNPN security credentials and the communication thereof via the public network (e.g., the various network entities of the public network) in connection with a PLMN registration procedure improves SNPN security requirements (e.g., improves the configuring of the connection to, or accessing of, the SNPN by the terminal).

Figure 3D:
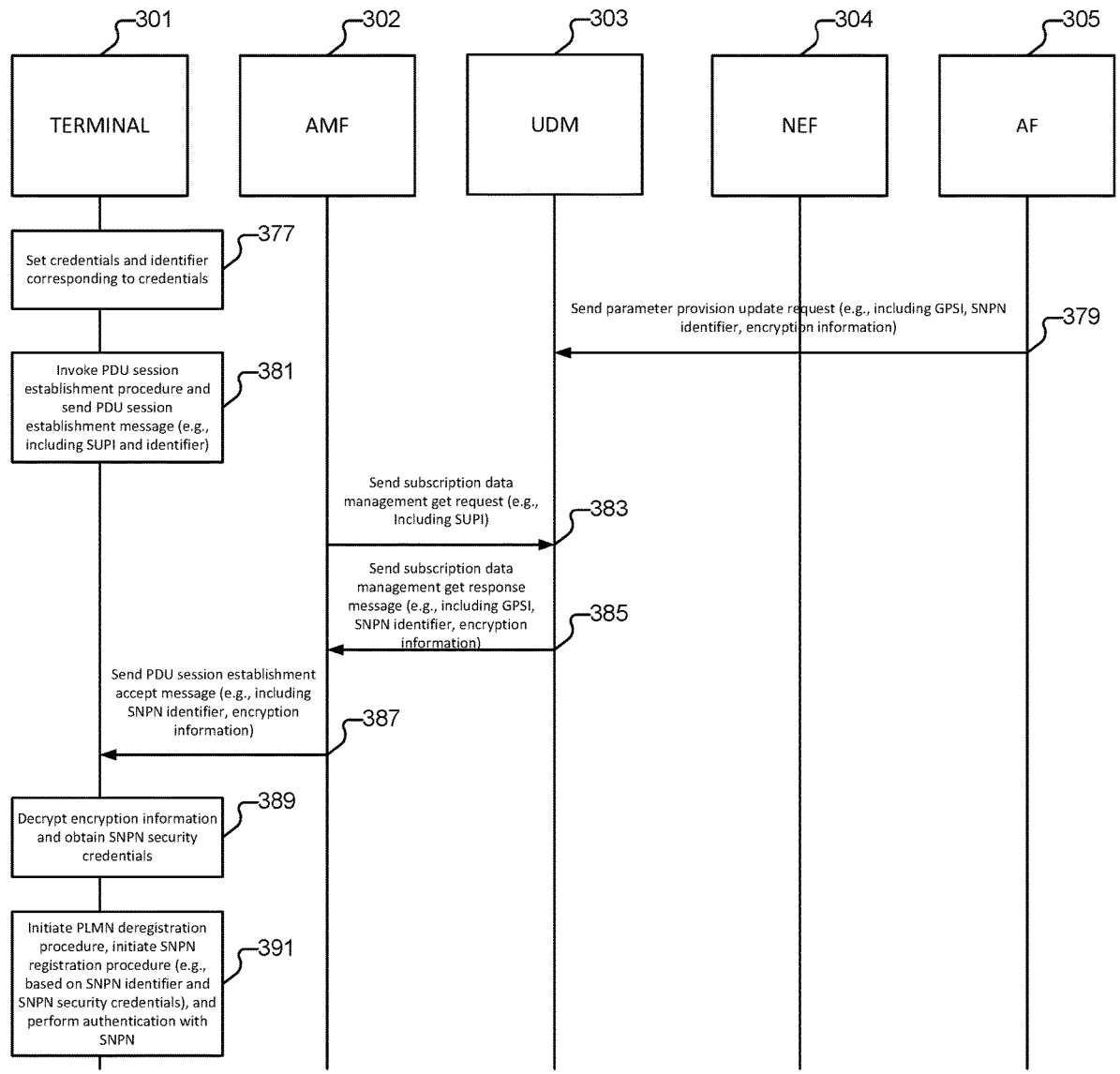
FIG. 3D is a flowchart of a method for using a Protocol Data Unit (PDU) session establishment procedure in connection with providing information to a terminal for the terminal to access the first non-public network according to various embodiments of the present application.

FIG. 3D is a flowchart of a method for using a Protocol Data Unit (PDU) session establishment procedure in connection with providing information to a terminal for the terminal to access the first non-public network according to various embodiments of the present application.

As illustrated in FIG. 3D, a system for implementing process 375 may include terminal 301, an AMF 302, a UDM 303, an NEF 304, and an AF 305. According to various embodiments, the first network described in connection with process 375 may include first network 10 of system 100 of FIG. 1 (e.g., a 5G network, a PLMN, etc.), and the first non-public network described in connection with process 375 may include first non-public network 20 of system 100 of FIG. 1 (e.g., an NPN such as an SNPN). Process 375 may be implemented at least in part by system 100 of FIG. 1, and/or computer system 500 of FIG. 5.

According to various embodiments, terminal 301 is provided with the security credentials corresponding to a non-public network via a PDU session establishment procedure. In response to receiving the security credentials, the terminal may register with and/or access the non-public network.

At 377, credentials and an identifier corresponding to credentials are set. In some embodiments, the terminal 301 presets or pre-defines credentials. 377 of process 375 may correspond to, or be similar to, 310 of process 300 of FIG. 3A, 327 of process 325 of FIG. 3B, and/or 352 of process 350 of FIG. 3C. The credentials and the identifier corresponding to the credentials may be stored locally at terminal 301.

At 379, a parameter provision update request is communicated. 379 of process 375 may correspond to, or be similar to, 312 of process 300 of FIG. 3A and/or 354 of process 350 of FIG. 3C. For example, AF 305 may communicate the parameter provision update request message (e.g., Nudm_ParameterProvision_Update request message) to UDM 303. The parameter provision update request may include the generic public subscription identifier (GPSI), the SNPN identifier, and the corresponding encryption information (e.g., encrypted security credentials). The GPSI may be an identifier associated with terminal 301 (e.g., to ensure that the encryption information is sent to the terminal 301).

At 381, a PDU session establishment procedure is invoked. The PDU session establishment procedure may be invoked at terminal 301. For example, the PDU session establishment procedure may be invoked in response to a user (or administrator of terminal 301) inputting a selection to initiate the PDU session establishment procedure. The terminal 301 may communicate the request for encryption information in response to a determination that a context of the terminal 301 satisfies one or more criteria (e.g., a particular application running, a location of the terminal, and/or a current time, etc.). As an example, the terminal 301 may invoke the PDU session establishment procedure in response to an application (e.g., running on the terminal 301) requesting, or otherwise attempting, to obtain a service from a network. As another example, the terminal 301 may invoke the PDU session establishment procedure in response to a request (or an attempt) to connect to, or access, the non-public network.

In response to invoking the PDU session establishment procedure, the terminal 301 may send a PDU session establishment message to the public network (e.g., to AMF 302). According to various embodiments, the PDU session establishment message may comprise the SUPI and an identifier used to obtain the encryption information (e.g., the encrypted security credentials) corresponding to an SNPN. The identifier used to obtain the encryption information (e.g., the encrypted security credentials) corresponding to an SNPN may be an SNPN identifier (e.g., an identifier associated with the non-public network).

At 383, a subscription data management get request is communicated. 383 of process 375 may correspond to, or be similar to, 270 of process 250 of FIG. 2B and/or 358 of process 350 of FIG. 3C. In some embodiments, AMF 302 communicates to UDM 303 the subscription data management get request. The identifier for obtaining the encryption information corresponding to the non-public network (e.g., the SUPI) may be communicated to the UDM 303 in a message (e.g., a subscription data management get (Nudm_SDM_Get) request message).

At 385, a subscription data management get response message is communicated. 385 of process 375 may correspond to, or be similar to, 275 of process 250 of FIG. 2B and/or 360 of process 350 of FIG. 3C. In some embodiments, UDM 303 sends the subscription data management get response message (e.g., a Nudm_SDM_Get message) to the AMF 302 in response to the subscription data management get request. The subscription data management get response message may comprise the SNPN identifier and corresponding encryption information. The subscription data management get response message may comprise the GPSI or other identifier corresponding to the terminal 301

At 387, a PDU session establishment accept message is communicated. 387 may correspond to, or be similar to, 280 of process 250 of FIG. 2B. In some embodiments, AMF 302 sends the PDU session establishment accept message to terminal 301 in response to the AMF 302 receiving the subscription data management get response message. The registration accept message may comprise the SNPN identifier and corresponding encryption information.

At 389, the encryption information is decrypted and the corresponding security credentials are obtained. 389 of process 375 may correspond to, or be similar to, 318 of process 300 of FIG. 3A, 335 of process 325 of FIG. 3B, and/or 364 of process 350 of FIG. 3C. In some embodiments, in response to receiving the PDU session establishment accept message, the terminal 301 obtains the encryption information therefrom and decrypts the encryption information. The encryption information may be decrypted based at least in part on the default credentials (e.g., the default credentials associated with the SNPN identifier).

At 391, a PLMN deregistration procedure is initiated, an SNPN registration procedure is initiated, and an authentication with the SNPN is initiated. 391 may correspond to, or be similar to, 320 of process 300 of FIG. 3A, and/or 337 of process 325 of FIG. 3B, and/or 366 of process 350 of FIG. 3C. In some embodiments, in response to obtaining the security credentials corresponding to the non-public network (e.g., the SNPN security credentials), the terminal 301 initiates deregistration from the public network (e.g., the PLMN deregistration) and initiates accessing, or connection with, the non-public network associated with the security credentials. The accessing or connecting with the non-public network may comprise registering and/or authenticating with the SNPN based at least in part on the SNPN identifier and the corresponding security credentials such as the SNPN security credentials. In response to successful authentication of the terminal 301 and/or non-public network, terminal 301 may access the non-public network and access services provided by the non-public network.

According to various embodiments, the AF function 305 is an implementation of the third network entity 205, the UDM 303 is an implementation of the second network entity 203, and the AMF 302 is an implementation of the first network entity 202. Correspondingly, the Nudm_Parameter-Provision_Update request message 379 is an implementation of the second message, the Nudm_SDM_Get request message 383 is an implementation of the third message, the Nudm_SDM_Get response message 385 is an implementation of the fourth message, the PDU session establishment request message 381 is an implementation of the fifth message, and the PDU session establishment accept message 387 is an implementation of the sixth message.

According to various embodiments, the AF 305 may directly send the Nudm_ParameterProvision_Update request message to the UDM 303, or the AF 305 may access the UDM 303 (e.g., send the message to the UDM 303) via the NEF 304. As illustrated in FIG. 3D, the dashed-line box indicates that the NEF 304 is an optional network entity. Specifically, the AF 305 may access the UDM 303 through the NEF 304 based at least in part on use of an NEF parameter provision update message (Nnef_ParameterProvision_Update) or an NEF traffic influence update message (Nnef_TrafficInfluence_Update). The AF 305 may first sends an NEF parameter provision update message or an NEF traffic influence update message to the NEF 304. The message includes the GPSI, the SNPN identifier, and the corresponding encryption information (e.g., encrypted security credentials such as credentials for the non-public network). After receiving the NEF parameter provision update message or the NEF traffic influence update message, the NEF 304 may send a UDM parameter provision update message (Nudm_ParameterProvision_Update) to the UDM 303. The message may include the GPSI, the SNPN identifier, and/or the corresponding encryption information. FIG. 3D provides a graphic presentation of such a procedure. There will be no further illustrations presented in the present embodiment.

At 381 of process 375, the terminal 301 triggers a PDU session establishment procedure. For the detailed steps of the PDU session establishment procedure, one may refer to the requirements of applicable communications standard(s), the entireties of which are hereby incorporated herein. No restriction is imposed here. According to various embodiments, terminal 301 may send a PDU session establishment request message to the AMF 302 in connection with establishing a PDU session. Such a message may include the SUPI and the identifier used in connection with obtaining the SNPN encrypted credentials. As an example, the SUPI may uniquely identify the terminal 301, and the identifier used in connection with obtaining the SNPN encrypted credentials may be used to trigger (e.g., cause or otherwise instruct) the AMF 302 to request the encrypted credentials from the UDM 303. The AMF 302 may receive the PDU session establishment request message sent by terminal 301, the AMF 302 may analyze the PDU session establishment request message and extracts therefrom the SUPI and the identifier used in connection with obtaining the SNPN encrypted credentials. AMF 302 may use the identifier used in connection with obtaining the SNPN encrypted credentials as a basis to package or add the SUPI into the Nudm_SDM_Get request message, which AMF 302 sends to the UDM 303 in order to request the encryption information from the UDM 303. At 385, the UDM 303 may parse out the SUPI from the Nudm_SDM_Get request message. UDM 303 may use the correspondence between the GPSI and the SUPI as a basis to map the SUPI of terminal 301 to the GPSI of terminal 301 and then UDM 303 obtains the SNPN identifier corresponding to the terminal 301 and the corresponding encryption information. UDM 303 may package or add the SNPN identifier and the corresponding encrypted credentials into the Nudm_SDM_Get response message, which UDM 303 may send to the AMF 302. At 387 of process 375, the AMF 302 may parse out the SNPN identifier and the corresponding encryption information from the Nudm_SDM_Get response message. AMF 302 may package or add the SNPN identifier and the corresponding encrypted credentials into the PDU session establishment accept message, and AMF 302 may send the PDU session establishment accept message to the terminal that initiated the PDU session establishment request (e.g., terminal 301). At 389, terminal 301 parses out the SNPN identifier and the corresponding encryption information from the PDU session establishment accept message. Terminal 301 may look up the preset default credentials and the SNPN identifier corresponding to the default credentials and may use the default credentials corresponding to the received SNPN identifier to decrypt the encrypted credentials and obtain the SNPN security credentials. At 391, terminal 301 may initiate the PLMN deregistration procedure on the one hand while initiating the SNPN registration procedure based at least in part on the SNPN identifier and SNPN security credentials on the other, and completes authentication with the SNPN corresponding to the SNPN identifier. According to various embodiments, at 391, there is no restriction on the chronological order in which the PLMN deregistration procedure and the SNPN registration procedure (e.g., both initiated by the terminal 301) occur. The order in which the PLMN deregistration procedure and the SNPN registration procedure or authentication of the SNPN are performed may be determined according to the communication capabilities of the terminal 301.

According to various embodiments, by modifying the terminal-initiated PDU session establishment procedure, reusing a portion of the messages in the PDU session establishment procedure, and issuing or communicating the encrypted credentials to the terminal based at least in part on communication among network entities such as the UDM 303 and the AMF 302 in the PLMN core network, the terminal is enabled to decrypt the SNPN security credentials therefrom and to successfully access the SNPN with the SNPN security credentials. The encryption of the SNPN security credentials and the communication thereof via the public network (e.g., the various network entities of the public network) improves SNPN security requirements (e.g., improves the configuring of the connection to, or accessing of, the SNPN by the terminal). For example, the encryption of the SNPN security credentials and the communication thereof via the public network may enable the connection or access of the SNPN by the terminal to satisfy SNPN security requirements.

Figure 4A:
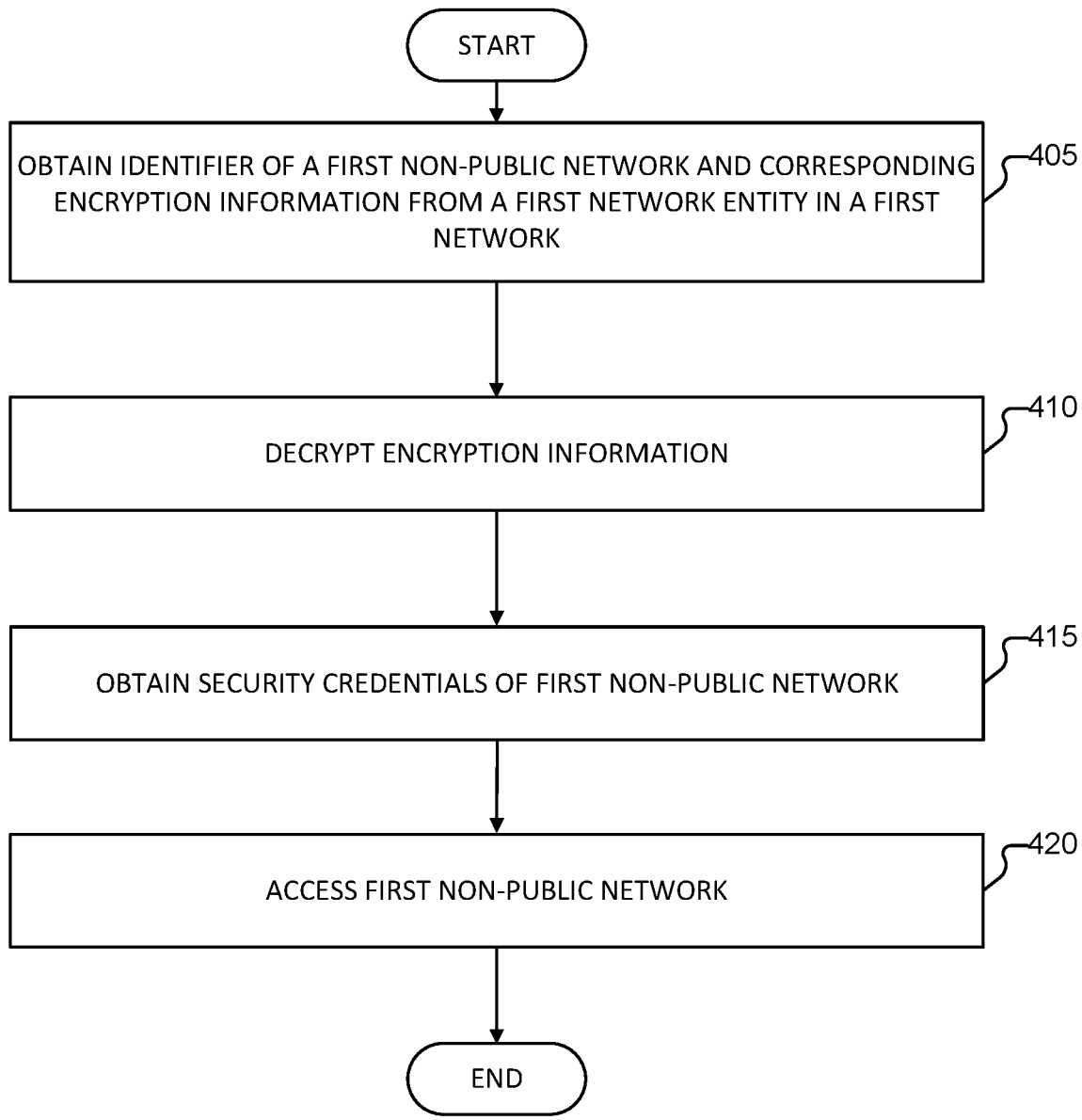
FIG. 4A is a flowchart of a method for accessing a network according to various embodiments of the present application.

FIG. 4A is a flowchart of a method for accessing a network according to various embodiments of the present application.

Figure 5:
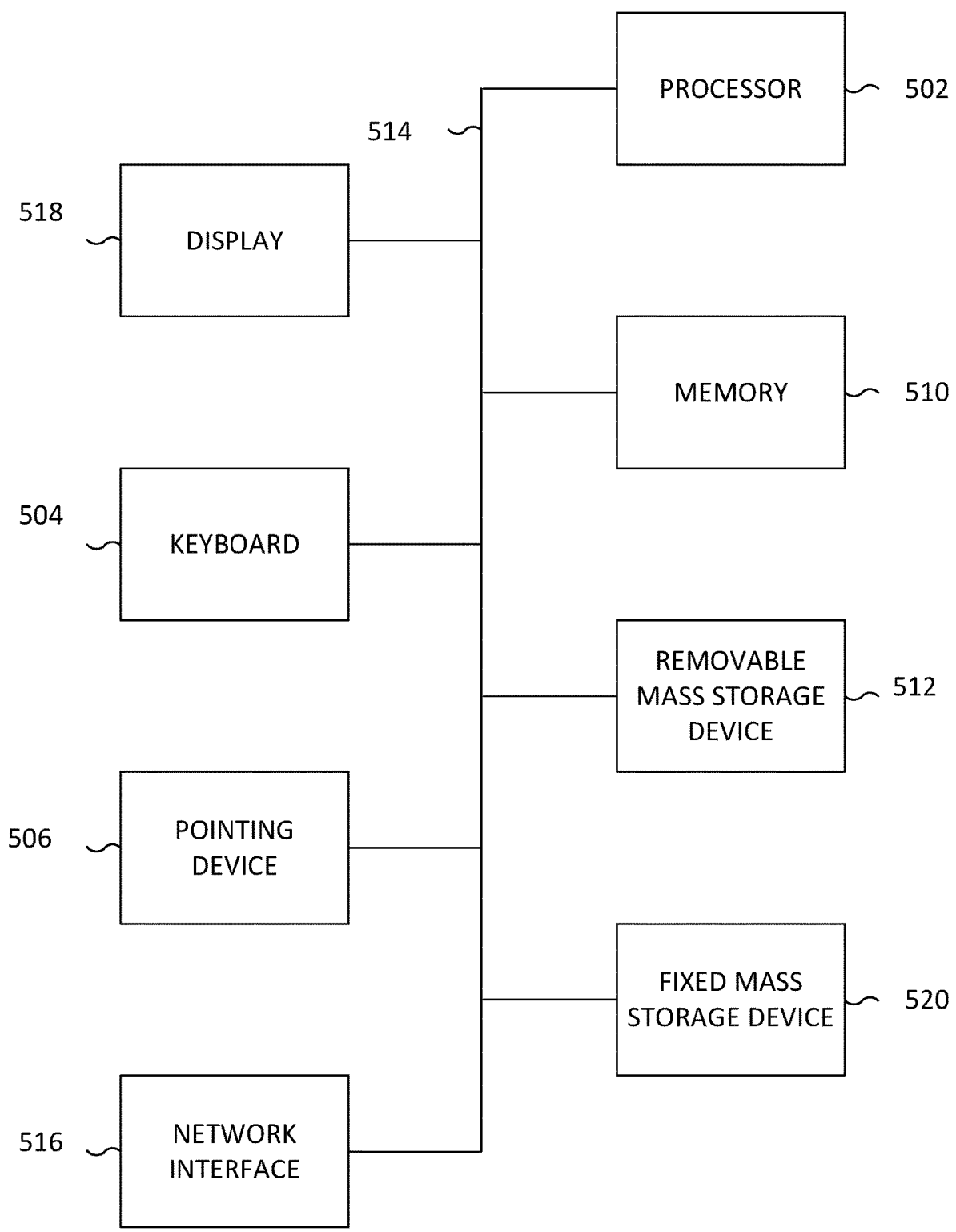
FIG. 5 is a functional diagram of a computer system according to various embodiments of the present application.

Process 400 may be implemented at least in part by system 100 of FIG. 1, and/or computer system 500 of FIG. 5. Process 400 may be implemented by a terminal such as a mobile phone, etc.

At 405, an identifier of a first non-public network and corresponding encryption information is obtained. The identifier of a first non-public network and corresponding encryption information may be obtained from a first network (e.g., a first network entity such as an AMF of a first network). The encryption information may comprise encrypted security credentials, and the security credentials may be used in connection with accessing the first non-public network. According to various embodiments, the identifier of a first non-public network and corresponding encryption information is communicated to the terminal in a sixth message.

At 410, the encryption information is decrypted. In some embodiments, a terminal decrypts the encryption information such as in response to receiving the identifier corresponding to the first non-public network and the corresponding encryption information (e.g., in response to receiving the sixth message). The terminal may obtain the security credentials for the first non-public network based at least in part on decrypting the encryption information.

According to various embodiments, the terminal decrypts the encryption information based at least in part on default credentials. The terminal may store the default credentials in advance. The default credentials may be mapped to a particular network identifier (e.g., identifier of the first non-public network). As an example, the decryption of the encryption information may be based at least in part on public-key cryptography. The default credentials are associated with the identifier of the first non-public network. In some implementations, the encryption information is decrypted using a private key associated with the terminal (e.g., the first non-public network or the first network encrypted the encryption information with a public key associated with the terminal).

At 415, security credentials of the first non-public network are obtained. In some embodiments, in response to decrypting the encryption information, the terminal obtains the security credentials from the decrypted encryption information. In response to decrypting the encryption information, the terminal may store the security credentials for the first non-public network in association with the identifier for the first non-public network. For example, the terminal may store the security credentials for the first non-public network in a mapping of network identifiers to corresponding security credentials. In some embodiments, the terminal updates or creates a network profile for the first non-public network. The network profile may be locally stored at the terminal and/or may comprise settings and configurations of the first non-public network.

At 420, the first non-public network is accessed. In some embodiments, the terminal accesses the first non-public network after (e.g., in response to) the encryption information being decrypted/obtained. The terminal may access the first non-public network based at least in part on the identifier corresponding to the first non-public network and the corresponding security credentials (e.g., the decrypted encryption information). For example, the terminal may use the identifier corresponding to the first non-public network and/or the corresponding security credentials in connection with an authentication of the terminal with the first non-public network.

According to various embodiments, before the terminal receives a sixth message issued by the first network entity in the first network, the terminal may send to a third network entity a notification message that the terminal has accessed (or connected to) the first network. The communication of the notification that the terminal accessed the first network may trigger the third network entity to issue and/or communicate encrypted credentials of the first non-public network via the first network.

Various embodiments include deregistering the first network. For example, the terminal may invoke a procedure for deregistering the first network in response to obtaining the security credentials for the first non-public network and/or in response to the terminal accessing the first non-public network (e.g., a determination that the terminal successfully authenticated with the first non-public network).

In some embodiments, the sixth message is a downlink non-access stratum transport (DL NAS TRANSPORT) message.

In some embodiments, before the terminal receives a sixth message issued or communicated by the first network entity in the first network, the terminal may send to the first network entity a fifth message. The fifth message may comprise an identifier used in connection with obtaining encryption information (e.g., encrypted security credentials) of the first non-public network. The communication of the fifth message may cause the first network entity to request the encryption information of the first non-public network (e.g., from a second network entity in the first network).

In some embodiments, the fifth message is a registration request message, and the sixth message is a registration accept message; or the fifth message is a protocol data unit (PDU) session establishment request message, and the sixth message is a protocol data unit (PDU) session establishment accept message.

In some embodiments, the identifier of the first non-public network includes the public land mobile network identifier (PLMN ID) and the network identifier (NID).

In some embodiments, the first non-public network is an SNPN. The first network may be a public network, such as a PLMN, or may be a second non-public network, such as a PNI-NPN.

Figure 4B:
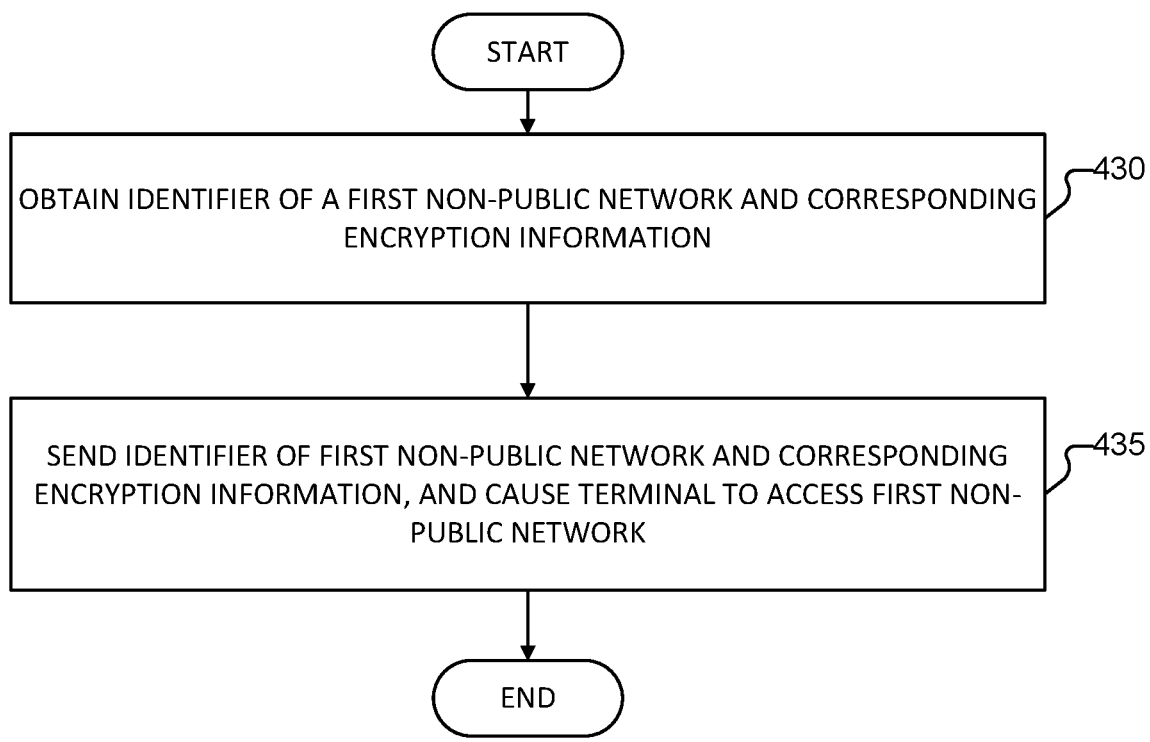
FIG. 4B is a flowchart of a method for accessing a network according to various embodiments of the present application.

FIG. 4B is a flowchart of a method for accessing a network according to various embodiments of the present application.

Process 425 may be implemented at least in part by system 100 of FIG. 1, and/or computer system 500 of FIG. 5. Process 425 may be implemented by an entity of a public network. For example, process 425 may be implemented by a first network entity (e.g., an AMF) of the first network.

At 430, an identifier of a first non-public network and corresponding encryption information are obtained. For example, a fourth message is received, and the message comprises the identifier of the first non-public network and corresponding encryption information. In some embodiments, the first network entity (e.g., an AMF) of the first network receives the fourth message from a second network entity (e.g., a UDM) of the first network.

At 435, an identifier of the first non-public network and corresponding encryption information are communicated. The communication of the identifier of the first non-public network and corresponding encryption information may cause a terminal to access the first non-public network. In some embodiments, the first network entity (e.g., an AMF) of the first network sends a sixth message to a terminal, and the sixth message comprises the identifier of the first non-public network and the corresponding encryption information.

In some embodiments, before the first network entity (e.g., the AMF) of the first network receives the identifier of the first non-public network and corresponding encryption information (e.g., prior to receiving a fourth message issued by the second network entity in the first network), the first network entity communicates a third message to the second network entity, the third message comprising the identifier of the terminal and the identifier used in connection with obtaining the encrypted credentials of the first non-public network.

In some embodiments, the third message is a subscription data management get (Nudm_SDM_Get) request message, and the fourth message is a subscription data management get (Nudm_SDM_Get) response message.

In some embodiments, prior to sending the third message to the second network entity, it further comprises: receiving a fifth message sent by the user equipment, the fifth message comprising an identifier used to acquire the encrypted credentials of the first non-public network so as to cause the first network entity to request the encrypted credentials of the first non-public network from the second network entity.

In some embodiments, the fifth message is a registration request message, and the sixth message is a registration accept message; or the fifth message is a protocol data unit (PDU) session establishment request message, and the sixth message is a protocol data unit (PDU) session establishment accept message.

In some embodiments, the first non-public network is an SNPN. The first network may be a public network, such as a PLMN, or may be a second non-public network, such as a PNI-NPN.

In some embodiments, the first network entity is an AMF.

Figure 4C:
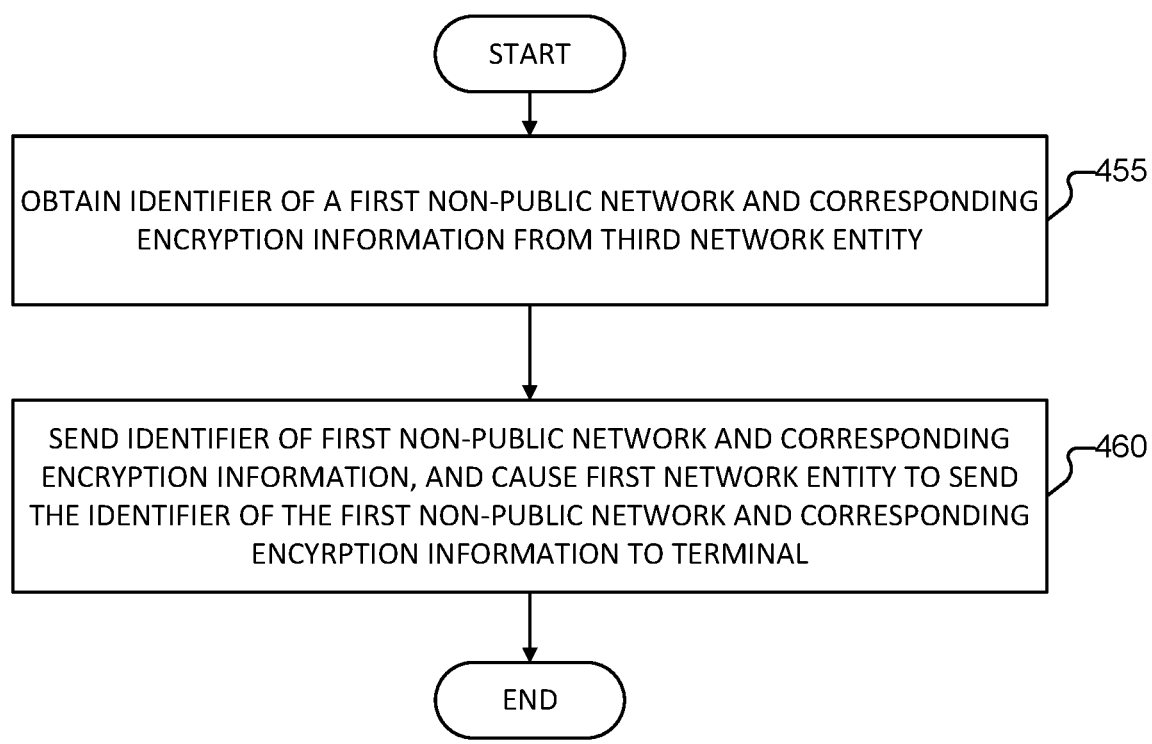
FIG. 4C is a flowchart of a method for accessing a network according to various embodiments of the present application.

FIG. 4C is a flowchart of a method for accessing a network according to various embodiments of the present application.

Process 450 may be implemented at least in part by system 100 of FIG. 1, and/or computer system 500 of FIG. 5. Process 450 may be implemented by a second network entity of a first network such as a UDM of the first network, etc.

At 455, an identifier of a first non-public network and corresponding encryption information are obtained. For example, a second message is received, and the message comprises the identifier of the first non-public network and corresponding encryption information. In some embodiments, the second network entity (e.g., a UDM) of the first network receives the second message from a third network entity (e.g., an AF) of the first network. The second message may comprise the identifier of a first non-public network and corresponding encryption information.

At 460, an identifier of the first non-public network and corresponding encryption information are communicated. The communication of the identifier of the first non-public encryption information and corresponding encryption information may cause a first network entity (e.g., AMF) of the first network to send the identifier of the first non-public network and corresponding encryption information to a terminal, and the communication of the identifier of the first non-public network and corresponding encryption information to the terminal may cause the terminal to access the non-public network. In some embodiments, the first network entity (e.g., an AMF) of the first network sends a fourth message to a first network entity (e.g., AMF) in the first network, and the fourth message comprises the identifier of the first non-public network and the corresponding encryption information.

In some embodiments, before the second network entity of the first network communicates the identifier of the first non-public network and corresponding encryption information to the first network entity (e.g., before the fourth message is communicated), the second network entity receives a third message from the first network entity. The third message may comprise the identifier of the terminal and an identifier used in connection with obtaining the encrypted credentials of the first non-public network.

In some embodiments, the third message is a subscription data management get (Nudm_SDM_Get) request message, and the fourth message is a subscription data management get (Nudm_SDM_Get) response message.

In some embodiments, the fourth message is a subscription data management notification (Nudm_SDM_Notification Notify) message.

In some embodiments, the second message is a parameter provision update request (Nudm_ParameterProvision_Update request) message.

In some embodiments, the first non-public network is an SNPN. The first network may be a public network, such as a PLMN, or may be a second non-public network, such as a PNI-NPN.

In some embodiments, the second network entity is a UDM.

Figure 4D:
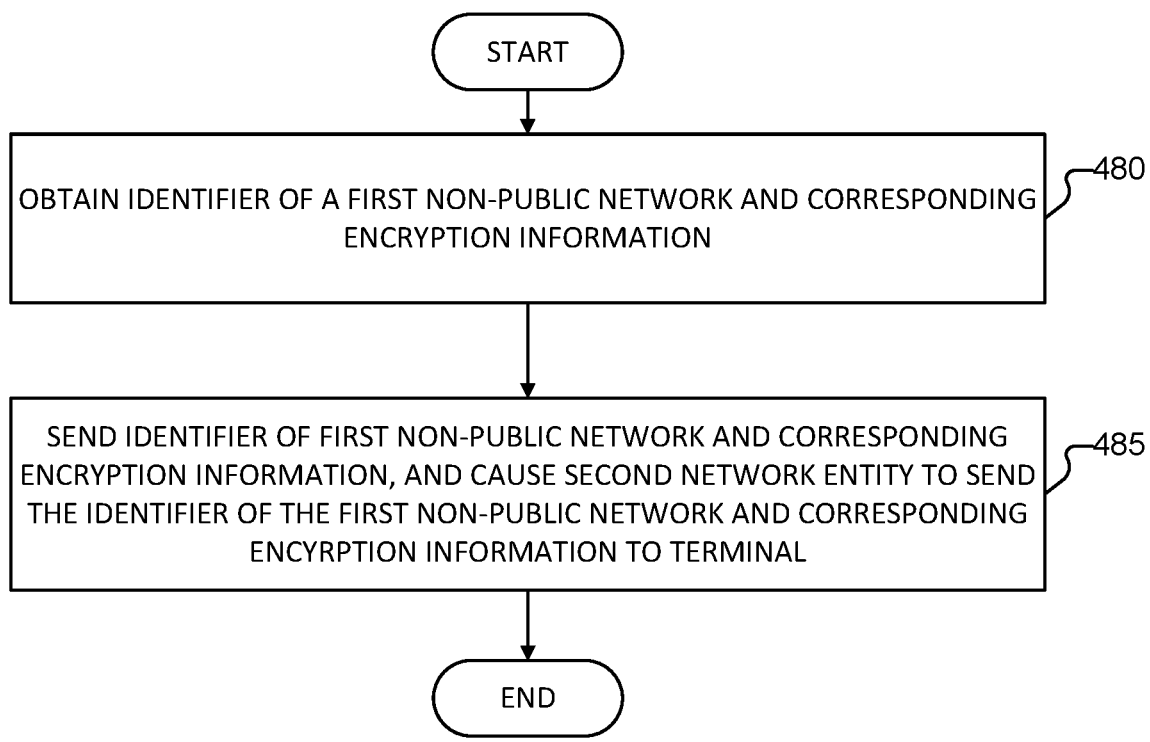
FIG. 4D is a flowchart of a method for accessing a network according to various embodiments of the present application.

FIG. 4D is a flowchart of yet another network access method provided by an exemplary embodiment of the present application. The method is described from the perspective of a third network entity. As shown in FIG. 4D, the method comprises:

FIG. 4D is a flowchart of a method for accessing a network according to various embodiments of the present application.

Process 475 may be implemented at least in part by system 100 of FIG. 1, and/or computer system 500 of FIG. 5. Process 475 may be implemented by an entity of a network. For example, process 475 may be implemented by a third network entity (e.g., an AF).

At 480, an identifier of a first non-public network and corresponding encryption information are obtained. For example, a third network entity may obtain the identifier of a first non-public network and corresponding encryption information based at least in part on a mapping of network identifiers to security credentials, and the security credentials may be encrypted to obtain the encryption information. As another example, the identifier of a first non-public network and corresponding encryption information may be obtained based at least in part on a mapping of terminal identifiers to security credentials for the network corresponding to the identifier of the first non-public network, and the security credentials may be encrypted to obtain the encryption information. The security credentials corresponding to the identifier of the first non-public network may be encrypted based at least in part on default credentials that are preset by or on behalf of the terminal (e.g., by the user or an administrator of the terminal), etc. For example, a public key of the default credentials may be used to encrypt the security credentials to obtain the encryption information.

At 485, the identifier of the first non-public network and corresponding encryption information are communicated. In some embodiments, the third network entity (e.g., an AF) communicates the identifier of the first non-public network and corresponding encryption information to a second network entity (e.g., a UDM of the first network). The communication of the identifier of the first non-public network and corresponding encryption information to the second network entity may cause the second network entity to communicate (e.g., issue) the identifier of the first non-public network and corresponding encryption information to a first network entity (e.g., AMF of the first network), and the first network entity may in turn communicate the identifier of the first non-public network and corresponding encryption information to the terminal. In response to receiving the identifier of the first non-public network and corresponding encryption information, the terminal may perform an access operation to access and/or authenticate or connect to the first non-public network.

In some embodiments, the third network entity (e.g., the AF) receives a first message, the receipt of the first message triggering the issuance and/or communication of the identifier of the first non-public network and the corresponding encrypted credentials via the first network.

In some embodiments, the receiving the first message comprises: receiving a notification message sent by the terminal notifying that the terminal has already accessed the first network; or receiving a trigger message sent by the terminal via a non-3GPP network. The receipt of the trigger message may trigger the third network entity to issue and/or communicate the identifier of the first non-public network and the encrypted credentials via the first network.

In some embodiments, the second message is a parameter provision update request (Nudm_ParameterProvision_Update request) message.

In some embodiments, the first non-public network is an SNPN. The first network may be a public network, such as a PLMN, or may be a second non-public network, such as a PNI-NPN.

In some embodiments, the third network entity is an AF.

According to various embodiments, a first network other than the first non-public network (a network that is different from the non-public network) is used in connection with providing terminal security credentials that may be used to access the first non-public network. The first network operatively serves as a transmission channel for the encryption information (e.g., encrypted security credentials) of the first non-public network. A network entity in the first network issues and/or communicates the encryption information of the first non-public network to the terminal, which may thereby enable the terminal to decrypt the first non-public network security credentials from the encrypted credentials and, based at least in part on the decrypted first non-public network security credentials, to securely access the first non-public network. Accordingly, a problem for providing a terminal with secure access to the first non-public network is solved.

Please note that the executing entity for each step in the method provided by the above embodiments may be the same device, or different devices may serve as the executing entity for the method. For example, the executing entity in steps 405, 410, 415, and 420 may be Device A. Or, to give another example, the executing entity in steps 405, 410, and 415 may be Device A, the executing entity in 420 may be Device B, and so on.

In addition, some of the processes described in the above embodiments and in the drawings contain multiple operations which appear according to a specific sequence. However, one must understand fully that these operations may be executed according to a sequence other than the one that appears in the text or may be executed in parallel. Operation sequence numbers such as 405, 410, 415, and 420 merely serve to differentiate the different operations from each other. The sequence numbers themselves do not represent any sequence of execution. In addition, these processes may include more or fewer operations, and these operations may be executed sequentially or in parallel. Please note that the descriptors "first," "second," "third," "fourth," "fifth," "sixth," and so on in this document are for differentiating different messages, devices, modules, and so on and do not represent a sequence, nor do "first", "second," "third," "fourth," "fifth," and "sixth" limit them to different types.

FIG. 5 is a functional diagram of a computer system according to various embodiments of the present application.

Computer system 500 may implement process 200 of FIG. 2A, process 250 of FIG. 2B, process 300 of FIG. 3A, process 325 of FIG. 3B, process 350 of FIG. 3C, process 375 of FIG. 3D, process 400 of FIG. 4A, process 425 of FIG. 4B, process 450 of FIG. 4C, and/or process 475 of FIG. 4D. Computer system 500 may implement at least part of system 100.

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Each of the embodiments contained in this specification is described in a progressive manner. The explanation of each embodiment focuses on areas of difference from the other embodiments, and the descriptions thereof may be mutually referenced regarding portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, an embodiment of the present application may take the form of one or more computer program products implemented on computer-usable storage media (including but not limited to magnetic disk memory, CD-ROM, and optical memory) containing computer-usable program code.

The memory in each of the embodiments described above may take the form of any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disks, or optical disks.

Computer system 500 may comprise a communication interface and/or communication component. The communication component may be configured to facilitate wired or wireless communication between the device on which the communication component is located (e.g., computer system 500) and other devices (e.g., an access point or a terminal connected to a network, etc.). The device on which the communication component is located (e.g., computer system 500) may access wireless networks based on a communications standard such as WiFi, 2G, 3G, 4G/LTE, 5G, or another mobile communications network or a combination thereof. In an exemplary embodiment, the communication component receives via broadcast channels broadcast signals or broadcast-related information from external broadcast management systems. In some embodiments, the communication component further comprises a near-field communication (NFC) module for promoting short-range communication. For example, communication can be achieved in the NFC module on the basis of radio-frequency identification (RFID) technology, Infrared Data Association (IrDA) technology, ultra-wide band (UWB) technology, Bluetooth (BT) technology, and other technology.

The display in each of the embodiments described above comprises a screen, and the screen may comprise a liquid crystal display (LCD) or touch panel (TP). If the screen comprises a touch panel, the screen may be implemented as a touchscreen to receive input signals from the user. The touch panel comprises one or more touch sensors to detect touch, swipe actions, and gestures on the touch panel. Said touch sensor not only can detect the boundaries of touch or swipe actions, but also can measure the duration and pressure related to said touch or swipe operations.

The power supply component in each of the embodiments described above is for providing electric power to all components in the device where the power supply component is located. The power supply component may include a power supply management system, one or more power supplies, and other components related to generating, managing, and allocating power to the device where the power supply component is located.

The audio component in each of the embodiments described above may be configured to output and/or input audio signals. For example, the audio component includes a microphone (MIC). When the device where the audio component is located is in an operating mode, e.g., when in calling mode, recording mode, or speech recognition mode, the microphone is configured to receive external audio signals. The received audio signals may be further stored in memory or sent by the communication component. In some embodiments, the audio component further comprises a speaker for outputting audio signals.

A person skilled in the art should understand that the embodiment of the present application can be provided as methods, systems or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program code.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be implemented by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements comprise not only those elements, but also other elements that have not been explicitly listed or those that are intrinsic to such processes, methods, merchandise, or devices. In the absence of further limitations, elements that are limited by the phrase "comprises a(n) . . . " do not exclude the existence of additional identical elements in the processes, methods, merchandise, or devices that comprise said elements.

The above-stated are merely embodiments of the present application and do not limit the present application. For a person skilled in the art, there may be various modifications and alterations of the present application. Any revision, equivalent substitution, or improvement done within the spirit and principles of the present application shall be included within the scope of claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A network access method, comprising:
receiving, by a terminal while registered to a public land mobile network (PLMN), over a control-plane signaling procedure of the PLMN, an identifier of a first network and corresponding encryption information, wherein:
the first network comprises a non-public network;
the encryption information comprises a plurality of encrypted security credentials for the first network;
the terminal receives the identifier of the first network and the corresponding encryption information from a second network that is different from the first network;
the encryption information comprises configuration data for the first network; and
the terminal receives the encryption information for the first network during a control plane communication procedure between the terminal and a first network entity in the second network, and the first network entity receives the encryption information for the first network entity from a network entity within the first network, wherein the control plane communication procedure comprises a non-access stratum (NAS) registration request/accept exchange, and the encryption information for the first network is received in a downlink NAS transport message;
decrypting, by the terminal, the encryption information to obtain decrypted encryption information, including:
decrypting the encryption information based at least in part on default credentials corresponding to the identifier of the first network, wherein the default credentials are obtained by performing a lookup in a local mapping of network identifiers to default credentials using the identifier of the first network; and
obtaining a plurality of security credentials of the first network based at least in part on the decrypted encryption information;
after successfully decrypting the encrypted configuration data, deregistering the terminal from the PLMN; and
accessing, by the terminal, the first network based at least in part on the identifier of the first network and the plurality of security credentials of the first network.

2. The method of claim 1, further comprising:
sending, by the terminal, to a third network entity a notification message that the terminal has accessed the second network,
wherein:
receipt of the notification message causes the third network entity to issue the encryption information of the first network via the second network; and
the terminal sends the notification message before the terminal receives a message comprising the identifier of the first network and the corresponding encryption information.

3. The method of claim 1, wherein the terminal deregisters the second network after receiving the identifier of the first network and the corresponding encryption information.

4. The method of claim 1, wherein the receiving the identifier of the first network and the corresponding encryption information comprises:
receiving a downlink non-access stratum transport message, the downlink non-access stratum transport message comprising the identifier of the first network and the corresponding encryption information.

5. The method of claim 1, further comprising:
sending to a first network entity of the second network a message, wherein the message comprises an identifier used in connection with obtaining the encryption information of the first network,
wherein:
receipt of the message comprising the identifier used in connection with obtaining the encryption information of the first network causes the first network entity to request, from a second network entity in the second network, the encryption information pertaining to the first network; and
the message comprising the identifier used in connection with obtaining the encryption information of the first network is communicated before the terminal receives a message comprising the identifier of the first network and the corresponding encryption information.

6. The method of claim 5, wherein:
the message comprising the identifier used in connection with obtaining the encryption information of the first network is a registration request message, and the message comprising the identifier of the first network and the corresponding encryption information is a registration accept message; or
the message comprising the identifier used in connection with obtaining the encryption information of the first network is a protocol data unit session establishment request message, and the message comprising the identifier of the first network and the corresponding encryption information is a protocol data unit session establishment accept message.

7. The method of claim 1, wherein the identifier of the first network comprises a public land mobile network identifier and a network identifier.

8. The method of claim 1, wherein the second network is a public network, or the second network is a second non-public network.

9. The method of claim 1, wherein the decrypting the encryption information based at least in part on default credentials corresponding to the identifier of the first network comprises:
obtaining the identifier of the first network;
performing a lookup against a mapping of network identifiers to default credentials to obtain the default credentials corresponding to the identifier of the first network; and
using the default credentials to decrypt the encryption information.

10. The method of claim 1, wherein the accessing the first network based at least in part on the identifier of the first network and the plurality of security credentials of the first network comprises:
deregistering, by the terminal, with the second network, wherein the terminal deregisters with the second network before connecting to the first network.

11. The method of claim 1, wherein the encryption information is provided by a network entity that simultaneously communicates with the first network and the second network, and the network entity provides the encryption information via one or more other entities of the second network.

12. The method of claim 1, wherein the non-public network is hosted by or on a public land mobile network (PLMN).

13. The method of claim 1, wherein the encryption information for the first network is provided when the terminal is attempting to register with the first network.

14. The method of claim 1, wherein the default credentials comprise at least one of: a manufacturer-installed root certificate, a pre-shared symmetric key, or an International Mobile Subscriber Identity (IMSI)-based key stored in a secure element of the terminal.

15. The method of claim 1, wherein the identifier of the first network comprises a combination of a public land mobile network identifier (PLMN-ID) and a network identifier (NID) that uniquely identifies the non-public network within the PLMN.

16. The method of claim 1, wherein the control plane communication procedure comprises a non-access stratum (NAS) registration request/accept exchange, and the encryption information for the first network is received in a downlink NAS transport message.

17. The method of claim 1, wherein the terminal maintains a secure mapping of non-public network identifiers to corresponding credentials in a tamper-resistant storage element, and wherein decrypting the encryption information comprises consulting the secure mapping.

18. A terminal, comprising:
one or more processors configured to:
receive, while registered to a public land mobile network (PLMN), over a control-plane signaling procedure of the PLMN, an identifier of a first network and corresponding encryption information, wherein:
the first network comprises a non-public network;
the encryption information comprises a plurality encrypted security credentials for the first network;
the terminal receives the identifier of the first network and the corresponding encryption information from a second network that is different from the first network;
the encryption information comprises configuration data for the first network; and
the terminal receives the encryption information for the first network during a control plane communication procedure between the terminal and a first network entity in the second network, and the first network entity receives the encryption information for the first network entity from a network entity within the first network, wherein the control plane communication procedure comprises a non-access stratum (NAS) registration request/accept exchange, and the encryption information for the first network is received in a downlink NAS transport message;
decrypt the encryption information to obtain decrypted encryption information, including:
decrypting the encryption information based at least in part on default credentials corresponding to the identifier of the first network, wherein the default credentials are obtained by performing a lookup in a local mapping of network identifiers to default credentials using the identifier of the first network; and
obtaining a plurality of security credentials of the first network based at least in part on the decrypted encryption information;
after successfully decrypting the encrypted configuration data, deregistering the terminal from the PLMN; and
access the first network based at least in part on the identifier of the first network and the plurality of security credentials of the first network; and
one or more memories coupled to the one or more processors, configured to provide the one or more processors with instructions.

19. A computer program product, the computer program product being embodied in a non-transitory computer readable storage medium and comprising computer instructions for:
receiving, by a terminal while registered to a public land mobile network (PLMN), over a control-plane signaling procedure of the PLMN, an identifier of a first network and corresponding encryption information, wherein:
the first network comprises a non-public network;
the encryption information comprises a plurality of encrypted security credentials for the first network;
the terminal receives the identifier of the first network and the corresponding encryption information from a second network that is different from the first network;
the encryption information comprises configuration data for the first network; and
the terminal receives the encryption information for the first network during a control plane communication procedure between the terminal and a first network entity in the second network, and the first network entity receives the encryption information for the first network entity from a network entity within the first network, wherein the control plane communication procedure comprises a non-access stratum (NAS) registration request/accept exchange, and the encryption information for the first network is received in a downlink NAS transport message;
decrypting, by the terminal, the encryption information to obtain decrypted encryption information, including:
decrypting the encryption information based at least in part on default credentials corresponding to the identifier of the first network, wherein the default credentials are obtained by performing a lookup in a local mapping of network identifiers to default credentials using the identifier of the first network; and
obtaining a plurality of security credentials of the first network based at least in part on the decrypted encryption information;
after successfully decrypting the encrypted configuration data, deregistering the terminal from the PLMN; and
accessing, by the terminal, the first network based at least in part on the identifier of the first network and the plurality of security credentials of the first network.

* * * * *